United States Patent
Yoshida et al.

(10) Patent No.: US 9,785,278 B2
(45) Date of Patent: Oct. 10, 2017

(54) DISPLAY DEVICE AND TOUCH-OPERATION PROCESSING METHOD

(71) Applicant: Sharp Kabushiki Kaisha, Osaka-shi, Osaka (JP)

(72) Inventors: Shigeto Yoshida, Osaka (JP); Masafumi Ueno, Osaka (JP); Tomohiro Kimura, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 14/903,854

(22) PCT Filed: Mar. 14, 2014

(86) PCT No.: PCT/JP2014/056853
§ 371 (c)(1),
(2) Date: Jan. 8, 2016

(87) PCT Pub. No.: WO2015/025549
PCT Pub. Date: Feb. 26, 2015

(65) Prior Publication Data
US 2016/0147365 A1 May 26, 2016

(30) Foreign Application Priority Data
Aug. 22, 2013 (JP) .................. 2013-172672

(51) Int. Cl.
*G06F 3/041* (2006.01)
*G06F 3/044* (2006.01)
(Continued)

(52) U.S. Cl.
CPC .......... *G06F 3/0416* (2013.01); *G06F 1/1626* (2013.01); *G06F 1/1643* (2013.01);
(Continued)

(58) Field of Classification Search
CPC .. G06F 3/0418; G06F 3/04883; G06F 3/0416; G06F 2203/04104; G06F 3/0412;
(Continued)

(56) References Cited

U.S. PATENT DOCUMENTS

2006/0197750 A1* 9/2006 Kerr ............... G06F 1/1626
345/173
2011/0285645 A1* 11/2011 Cho ............... G06F 3/0416
345/173
(Continued)

FOREIGN PATENT DOCUMENTS

JP       2011-164676 A    8/2011
JP       2012-8923 A      1/2012
(Continued)

OTHER PUBLICATIONS

Official Communication issued in International Patent Application No. PCT/JP2014/056853 dated May 20, 2014.

*Primary Examiner* — Md Saiful A Siddiqui
(74) *Attorney, Agent, or Firm* — Steven Reiss

(57) ABSTRACT

An erroneous operation is prevented in a display device detecting a touch operation for a display face and a part other than the display face. A display device (1) of the present invention includes: an operation acquiring unit (51) that acquires detection signals transmitted from detection electrodes arranged on a touch panel (14); a use form determining unit (55) that determines a holding form based on a touch position of the touch operation for an end face of the display device; and an insensitive area setting unit (58) that sets an insensitive area on the operation detecting member after the holding form is determined. The operation acquiring unit does not acquire detection signals transmitted from the detection electrodes included in the set insensitive area among the detection electrodes.

20 Claims, 12 Drawing Sheets

(51) Int. Cl.
 *G06F 1/16* (2006.01)
 *G06F 3/0484* (2013.01)
 *G06F 3/0488* (2013.01)

(52) U.S. Cl.
 CPC ............ *G06F 3/044* (2013.01); *G06F 3/0484* (2013.01); *G06F 3/04886* (2013.01)

(58) Field of Classification Search
 CPC ................ G06F 3/044; G06F 3/03545; G06F 2203/04106; G06F 3/0354; G06F 3/04
 See application file for complete search history.

(56) References Cited

U.S. PATENT DOCUMENTS

2012/0026200 A1* 2/2012 Okada ................. G06F 3/04886
 345/660
2013/0271426 A1 10/2013 Yumoto et al.
2014/0108979 A1* 4/2014 Davidson .............. G06F 3/0481
 715/765
2016/0179288 A1* 6/2016 Iida ....................... G06F 3/0488
 345/173

FOREIGN PATENT DOCUMENTS

JP 2012-27581 A 2/2012
JP 2012-69045 A 4/2012
JP 4955116 B1 6/2012

\* cited by examiner (a)

(b)

(c) (d)

DISPLAY DEVICE AND TOUCH-OPERATION PROCESSING METHOD

TECHNICAL FIELD

The present invention relates to a display device processing a touch operation and a touch-operation processing method.

BACKGROUND ART

In recent years, development of display devices each including a touch panel has progressed, and an example thereof includes Patent Literatures 1 and 2.

In Patent Literature 1, a display device has been disclosed which determines a user's holding hand holding the display device based on a detection result acquired by a first detection unit separately disposed in a part of the display device other than a display face and controls the display mode of an image displayed on the display face in accordance with the holding hand.

In Patent Literature 2, a mobile terminal and a key displaying method have been disclosed which optimize an input method by estimating a user's method of holding a terminal and a movable range of user's fingers by disposing sensors on the rear face and the side faces of a terminal casing and using information of the number of holding fingers, contact positions, and the like.

CITATION LIST

Patent Literatures

Patent Literature 1: JP 2011-164676 A (Published on Aug. 25, 2011)
Patent Literature 2: JP 2012-27581 A (Published on Feb. 9, 2012)
Patent Literature 3: Japanese Patent No. 4955116 (Registered on Mar. 23, 2012)

SUMMARY OF INVENTION

Technical Problem

However, in the conventional configuration described above, in the display device, in order to determine a holding form, separately from a sensor of a touch panel disposed on the display face (a keyboard arrangement face of a mobile terminal) of the display device, a dedicated sensor (a first detection unit disclosed in Patent Literature 1/a first sensor disclosed in Patent Literature 2) needs to be arranged. For this reason, the number of components mounted in the display device increases, a detection mechanism becomes complicated, and as a result, there is a problem that the processing load of the display device increases. In a case where the display device described above is applied to a mobile terminal which is particularly difficult to satisfy a request for thinning and lightening, the problem described above is particularly serious.

In a display device, in a case where an operation of a contact (or an approach) into a part other than a display face can be detected by a sensor of a touch panel arranged on the display face, the holding form can be determined without complicating a detection mechanism, in other words, without increasing the processing load.

In addition, it is desirable that an unintentional contact (or approach) into a part other than the display face is appropriately processed so as not to cause any erroneous operation.

The present invention is in view of the problems described above, and an object thereof is to realize a display device and a touch-operation processing method preventing an erroneous operation in a display device detecting an operation of a contact (or approach) into a display face and a part other than the display face without complicating a detection mechanism of the display device.

Solution to Problem

To solve the above problem, a display device according to an aspect of the present invention includes: a display member; an operation detecting member that is superimposed on the display member; a casing in which the display member and the operation detecting member are stored; and a plurality of detection electrodes being arranged in the operation detecting member. In the display device, the plurality of detection electrodes detect a touch operation for a display area of the display member, and some of the plurality of detection electrodes also detect a touch operation for an end face of the casing other than the display area. The display device includes: an operation acquiring unit that acquires detection signals transmitted from the detection electrodes; a use form determining unit that determines a holding form based on a touch position of the touch operation for the end face that is received as the operation acquiring unit acquires the detection signals; and an insensitive area setting unit that sets an area including the touch position as an insensitive area not receiving the touch operation after the holding form is determined by the use form determining unit. The operation acquiring unit does not acquire detection signals transmitted from the detection electrodes included in the insensitive area set by the insensitive area setting unit among the plurality of the detection electrodes.

To solve the above problem, a touch-operation processing method according to another aspect of the present invention is executed by a display device including: a display member; an operation detecting member that is superimposed on the display member; and a casing in which the display member and the operation detecting member are stored, a plurality of detection electrodes being arranged in the operation detecting member, the plurality of detection electrodes detecting a touch operation for a display area of the display member, and some of the plurality of detection electrodes also detecting a touch operation for an end face of the casing other than the display area. The touch-operation processing method includes: acquiring detection signals transmitted from the detection electrodes; determining a holding form based on a touch position of the touch operation for the end face that is received as the detection signals are acquired in the acquiring of detection signals; setting an area including the touch position as an insensitive area not receiving the touch operation after the holding form is determined in the determining of a holding form; and not acquiring detection signals transmitted from the detection electrodes included in the insensitive area set in the setting of an area among the plurality of the detection electrodes.

Advantageous Effects of Invention

According to an aspect of the present invention, an effect of preventing an erroneous operation in a display device detecting an operation of a contact (or approach) into a display face and a part other than the display face without complicating a detection mechanism of the display device is acquired.

BRIEF DESCRIPTION OF DRAWINGS

FIG. 6(a) is a diagram that illustrates the schematic configuration of a case where a cover glass is included, and FIG. 6(b) is a diagram that illustrates the schematic configuration of a case where a lens is included.

DESCRIPTION OF EMBODIMENTS

First, before detailed description of each embodiment of the present invention, the hardware configuration of a display device according to each embodiment of the present invention will be described.

[Schematic Configuration of Display Device]

First, the schematic configuration of the display device 1 will be described with reference to FIGS. 2 to 8(*b*). In the description presented below, while a case will be described in which the display device 1 is realized by a liquid crystal display, the display device is not limited thereto but may be configured by a plasma display, an organic EL display, a field emission display, or the like. In addition, while the display device 1 will be described as a plate-shaped member of which the face is rectangle, unless otherwise described, the display device is not limited thereto but may have a face having an oval shape, a circle shape, or the like and may have a shape having an uneven surface instead of the plate shape. In other words, the display device may have any shape, as long as a configuration capable of implementing functions described below is employed.

A case will be described with reference to FIGS. 2 and 3 in which the display device 1 functions as a mobile terminal. As examples of the mobile terminal to which the display device 1 according to the present invention is applied, there are a multi-function mobile phone (a so-called smartphone), a tablet, and the like.

Figure 2:
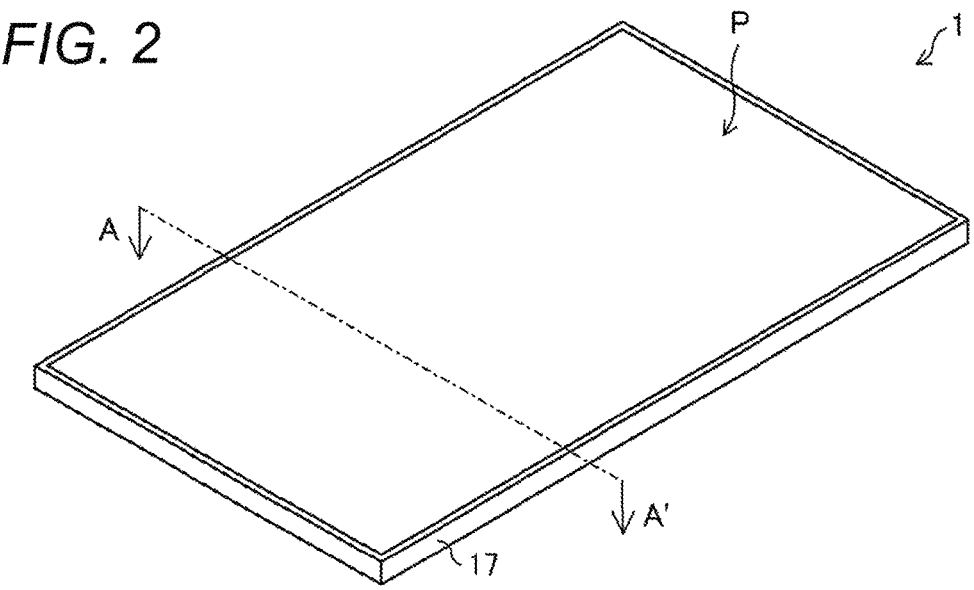
FIG. 2 is a perspective view that illustrates an example of a schematic configuration of a display device according to the present invention as a mobile terminal.

FIG. 2 is a perspective view that illustrates an example of a schematic configuration of the display device 1 as a mobile terminal. FIG. 3 illustrates an example of a schematic configuration of the display device 1 and is a cross-sectional view taken along line A-A' of the display device 1 illustrated in FIG. 2.

The display device 1 as the mobile terminal is a device capable of displaying an image and acquiring an input operation for the image. As illustrated in FIG. 2, the display device 1 has a shape defined by a casing 17, and an image is displayed inside a display area P of the display screen (display panel 12).

Figure 3:
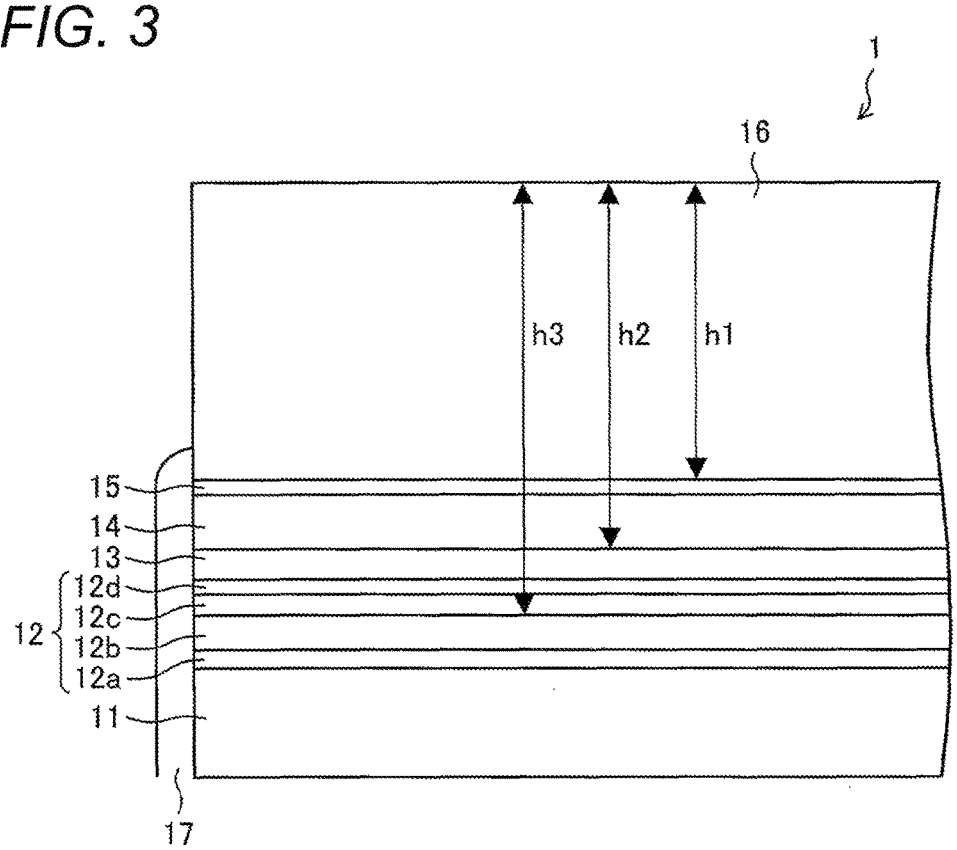
FIG. 3 is a cross-sectional view that illustrates an example of a schematic configuration of a display device according to the present invention.

More specifically, as illustrated in FIG. 3, the display device 1 is configured by stacking a display panel 12, a transparent adhesive layer (OCA) 13, a touch panel 14 (operation detecting member), a transparent adhesive layer 15, and a cover glass 16 on a backlight 11 in this order. Such members are supported by the casing 17 included in the display device 1. In other words, the casing 17 stores the display panel 12 and the touch panel 14.

The display panel 12 may employ a known configuration. For example, the display panel 12 is configured by: an active matrix substrate (not illustrated in the diagram) having an insulating property formed by using glass or the like; an opposing substrate (not illustrated in the diagram) that faces the active matrix substrate with a predetermined gap interposed therebetween and has light transmissivity formed by using glass or the like; and a liquid crystal layer interposed between the active matrix substrate and the opposing substrate. As the liquid crystal layer, any one of various types of liquid crystal layer may be used. For example, in the example illustrated in FIG. 3, two polarizing plates 12*a* and 12*d* arranged to have a TFT layer 12*b* including thin film transistors (TFT) interposed therebetween are arranged, and accordingly, a configuration capable of displaying gray scales of an image is formed. In addition, on the opposing substrate side, a color filter 12*c* is arranged, and accordingly, a configuration capable of color-displaying is formed.

On the display panel 12, data signal lines extending in the column direction, scan signal lines and capacitance wirings extending in the row direction, and pixels aligned in the row and column directions are disposed. Various signal lines are disposed on the active matrix substrate.

The structures of the pixels have the same configuration, and, in accordance with one pixel, at least one pixel electrode is disposed, and one data signal line, one scan signal line, and one capacitance wiring are disposed. In each pixel, on the active matrix substrate, the pixel electrode is connected to the data signal line through the thin film transistor arranged in the TFT layer 12b connected to the scan signal line, and liquid crystal capacitance is formed between the opposing electrode disposed in the opposing substrate and the pixel electrode.

The thin film transistor disposed in each pixel has a source electrode connected to a pixel electrode, a drain electrode connected to a data signal line, and a gate electrode connected to a scan signal line. Accordingly, the transistor is controlled to be turned on/off according to a scan signal (gate signal) supplied from the scan signal line, a voltage according to a data signal supplied to the data signal line is applied to the liquid crystal layer, and the voltage is configured to be maintained when the transistor is turned off.

The display panel 12 is controlled by various drive circuits and a display control circuit (none thereof is illustrated in the drawing) included in the display device 1. Examples of the various drive circuits include a data signal line driving circuit, a scan signal line driving circuit, and the like. By controlling the display panel 12 using such circuits, an image is displayed in the display area P.

The backlight 11 emits display light to be incident to the display panel 12. Here, the backlight 11 may be externally attached to the display device 1.

The touch panel 14 is superimposed on the display panel 12 and is a member that detects a contact or an approach of a target object such as a user's finger or an indication pen at least into the inside of the display area P of the display panel 12. Accordingly, a user's input operation for an image displayed in the display area P is acquired, and operations of predetermined functions (various applications) based on the input operation can be controlled. As the touch panel 14, for example, a touch panel of an electrostatic capacity type may be employed.

Between the display panel 12 and the touch panel 14, the transparent adhesive layer 13 is disposed, and the display panel 12 and the touch panel 14 are fixed. Instead of this transparent adhesive layer 13, an air layer (air gap) may be arranged. However, in the display device 1 according to each embodiment, it is preferable to arrange the transparent adhesive layer 13. As illustrated in FIG. 3, by arranging the transparent adhesive layer 13, the optical characteristics of the display device 1 can be improved, and the film thickness (gap) controllability of each layer can be improved.

The transparent adhesive layer 15 is disposed between the touch panel 14 and the cover glass 16 and fixes the touch panel 14 and the cover glass 16.

The cover glass 16 is a plate-shaped member having transparency and is arranged to cover the touch panel 14 so as to protect the touch panel from 14 from external factors. Here, while a case is assumed in which the shape of the cover glass 16 is a rectangular shape, the shape is not limited thereto but may have a notched shape in the end portion (outer edge) thereof. In such a case, since a distance from the outer edge of the cover glass 16 to an outer-edge electrode group (an electrode group (see FIGS. 6(a) and 6(b)) configured by a detection electrode 31a and a drive electrode 32a) of the touch panel 14 can be shortened, the detection accuracy on the outer surface A (the outer surface A (see FIGS. 6(a) and 6(b)) of the display device 1 other than the display area P) of the display device 1 can be improved.

The casing 17, as described above, stores the display panel 12 and the touch panel 14. A material having a high dielectric constant is used for the casing 17. Here, the "material having a high dielectric constant" represents a material having a dielectric constant of a degree for which a contact or an approach of a finger or the like into the outer edge of the display device 1 can be easily detected by the touch panel 14. More specifically, as the material used for the casing 17, it is preferable to use a material having a dielectric constant of the degree for which the detection can be easily made, in other words, a dielectric constant of three or more (preferably, six or more). By using a material having such a high dielectric constant for the casing 17, the detection accuracy on the outer edge of the display device 1 can be improved.

The thickness of each member of the display device 1 as the mobile terminal according to each embodiment, for example, is as follows.

The thickness of the backlight 11 is 0.74 mm, the thickness of the polarizing plate 12a is 0.15 mm, the thickness of the TFT layer 12b is 0.25 mm, the thickness of the color filter 12c is 0.15 mm, the thickness of the polarizing plate 12d is 0.11 mm, the thickness of the transparent adhesive layer 13 is 0.2 mm, the thickness of the touch panel 14 is 0.4 mm, the thickness of the transparent adhesive layer 15 is 0.1 mm, and the thickness h1 of the cover glass 16 is 2 mm. In addition, a thickness h2 from the surface of the cover glass 16 to an interface between the touch panel 14 and the transparent adhesive layer 13 is 2.5 mm, and a thickness h3 from the surface of the cover glass 16 to an interface between the color filter 12c and the TFT layer 12b is 2.96 mm.

It is apparent that the thicknesses described above represent an example, and the thicknesses are appropriately changed according to the size and the like of a mobile terminal including the display device 1. In addition, the horizontal length (width) of the casing 17, as will be described later, is set to be a length in which a contact or an approach of a finger or the like into the outer surface (end face) of the casing 17 can be detected by the touch panel 14 or less.

Modified Example

Figure 4:
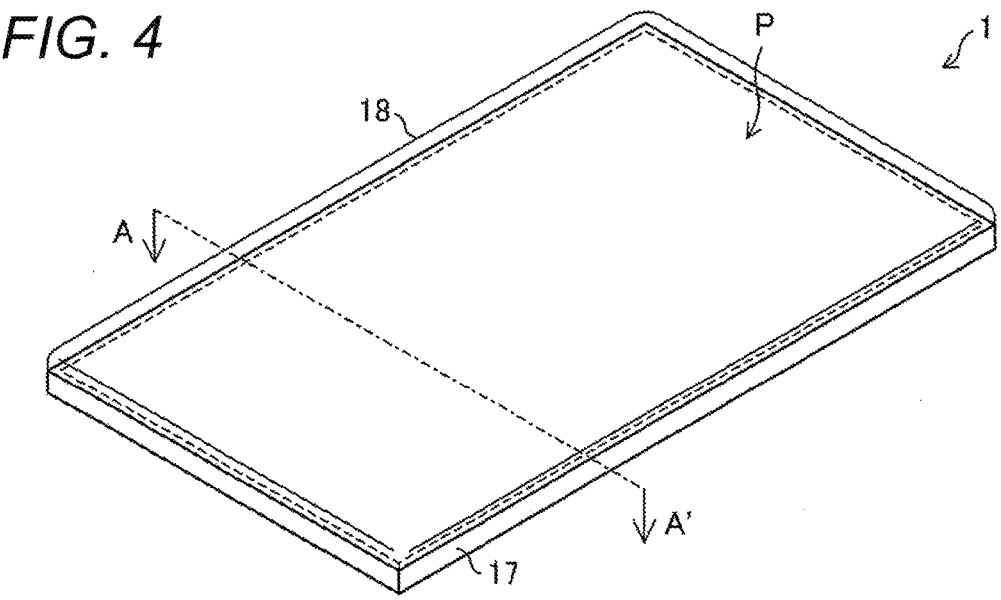
FIG. 4 is a perspective view that illustrates another example of the schematic configuration of a display device according to the present invention as a mobile terminal.
Figure 5:
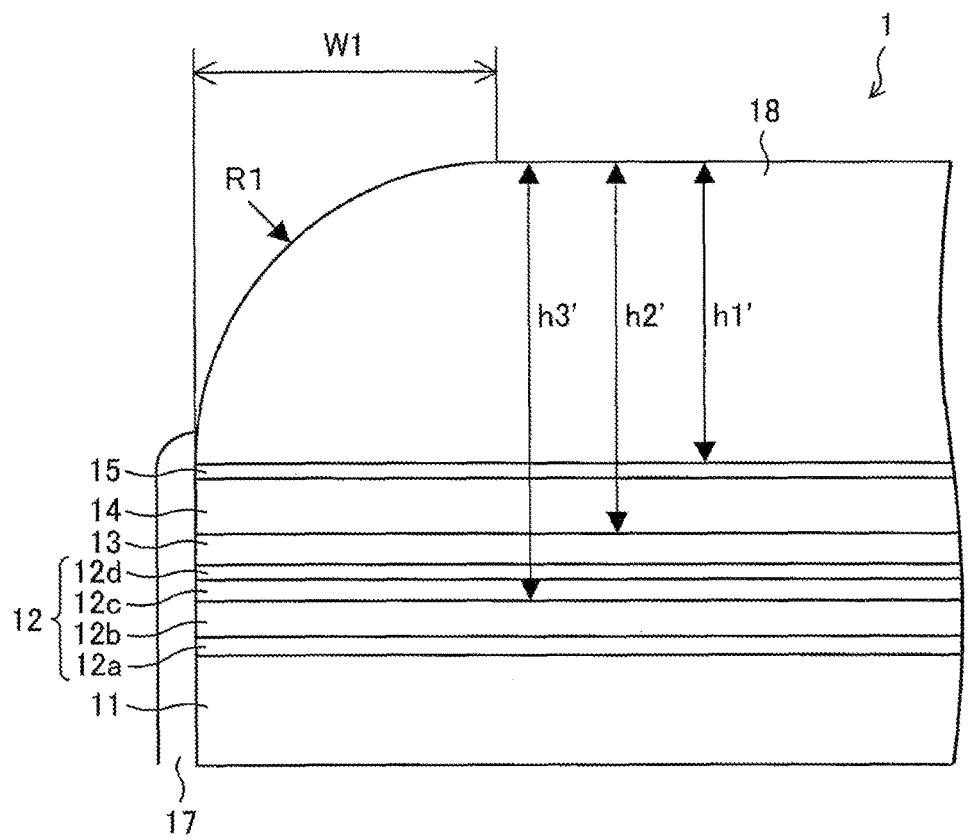
FIG. 5 is a cross-sectional view that illustrates another example of the schematic configuration of a display device according to the present invention.

A modified example of the display device 1 will be described with reference to FIGS. 4 and 5. FIG. 4 is a perspective view that illustrates another example of the schematic configuration of the display device 1 as the mobile terminal. FIG. 5 illustrates an example of the schematic configuration of the display device 1 and is a schematic cross-sectional view of the display device 1 illustrated in FIG. 4 taken along line A-A'.

The display device 1 according to the modified example, as illustrated in FIGS. 4 and 5, includes a lens 18 instead of the cover glass 16, which is different from the display device 1 illustrated in FIGS. 2 and 3. However, the functions of the other members such as the display panel 12 and the touch panel 14 are the same as those of the members of the display device 1. Thus, mainly, parts different from those of the display device 1 will be described, and description of the others will not be presented.

As illustrated in FIG. 5, the lens 18 is stacked on the touch panel 14 of the display device 1. This lens 18 is a plate-shaped member having transparency and is arranged to cover the touch panel 14 so as to protect the touch panel 14 from external factors. The lens 18 has a notched portion R1 (notched shape) in the end portion (outer edge) thereof and changes the traveling direction of light exiting from the display panel 12.

By arranging the lens 18 including the notched portion R1, the detection accuracy of the touch panel 14 on the outer edge of the display device 1 can be improved. The traveling direction of light emitted from a pixel arranged on the outer edge of the display panel 12 is changed by the notched portion R1 and exits from an area (non-display area) disposed on the outer side of the pixel. Accordingly, the viewing angle (a display area when seen from a user) of an image can be enlarged. In a case the enlargement function is not necessary, the notched portion R1 does not necessarily need to be included.

Regarding the thickness of each member of the display device 1 based on this modified example, the thickness of each member other than the cover glass 16 is the same as that of the display device 1 illustrated in FIGS. 2 and 3. In the display device 1 illustrated in FIGS. 4 and 5, the thickness h1' of the lens 18 is 2.13 mm, a thickness h2' from the surface of the lens 18 to an interface between the touch panel 14 and the transparent adhesive layer 13 is 2.63 mm, and a thickness h3' from the surface of the lens 18 to an interface between the color filter 12c and the TFT layer 12b is 3.09 mm. The width w1 of the notched portion R1 is 2.1 mm. Such thicknesses are merely an example and are appropriately changed according to the size and the like of a mobile terminal including the display device 1.

[Specific Configuration of Display Device]

Next, a specific configuration of the display device 1 will be described with reference to FIGS. 6(a) and 6(b). FIGS. 6(a) and 6(b) are cross-sectional views illustrating examples of the specific configuration of the display device 1 according to the present invention, FIG. 6(a) is a diagram that illustrates the specific configuration of the display device 1 including the cover glass 16, and FIG. 6(b) is a diagram that illustrates the specific configuration of the display device 1 including the lens 18 according to the modified example. Here, for the simplification of the description, the configuration of the transparent adhesive layer 15 and the like illustrated in FIGS. 3 and 5 are not illustrated.

Hereinafter, an operation of causing a target object such as a finger, a touch pen, or the like to be in contact with or approach the display area or the end face regardless of user's intention will be collectively referred to as a touch operation.

As illustrated in FIG. 6(a), the touch panel 14 includes detection electrodes 31 and drive electrodes 32 as an electrode group used for detecting a touch operation using the target object on the substrate. In addition, detection electrodes 31a and drive electrodes 32a included in the electrode group are included as an outer-edge electrode group arranged along the outer edge of the touch panel 14 (in other words, the substrate described above).

As illustrated in FIG. 6(a), between the display panel 12 and the inner surface of the casing 17, a first wiring storing portion 12A, in which various wirings of the display panel 12 can be arranged, is included, and, between the touch panel 14 and the casing 17, a second wiring storing portion 14A, in which various wirings of the touch panel 14 are arranged, is included.

A shortest distance d between the touch panel 14 and the end face (the outer surface A illustrated in FIG. 6(a)) of the casing 17 other than the display area P is a detectable distance, in which a touch operation for the outer surface A can be detected by the touch panel 14, or less. According to such a configuration, a touch operation for the end face (the outer surface A) of the casing 17 other than the display area P can be detected.

According to the configuration described above, the touch panel 14 detecting a touch operation for the display area P can detect a touch operation for the outer surface A, and thus, a detection member (dedicated sensor) used for detecting a target object such as a finger for the outer surface A does not additionally need to be arranged. Accordingly, a touch operation for the end face can be detected without increasing the number of components of the display device 1 (without complicating the detection mechanism).

This shortest distance d, as illustrated more specifically in FIG. 6(a), is a first distance between each of the detection electrode 31a and the drive electrode 32a as the outer-edge electrode group included in the touch panel 14 and the outer surface A. It is preferable that this first distance (shortest distance d) is a second distance d1, which is a distance between the touch panel 14 (more specifically, the detection electrode 31 and the drive electrode 32) and the outer surface (a contact face of a finger or the like and the top face of the display device 1) of the cover glass 16, or less in the vertical direction of the display panel 12. In the case of such a configuration, a touch operation for the outer surface A of the casing 17 can be reliably detected.

As described above, the display device 1 has a configuration for achieving a thin frame (frameless) in which the shortest distance d is defined such that a contact or an approach of a finger or the like into the outer surface A of the casing 17 can be detected. In this way, a touch operation for the end face of the casing 17 can be sensed. In addition, by achieving a thin frame, the design of the display device 1 can be improved.

Modified Example

In the display device 1 based on the modified example, as illustrated in FIG. 6(b), a shortest distance d between the touch panel 14 and the end face (here, the outer surface B) of the casing 17 other than the display area P is a detectable distance, in which a touch operation for the outer surface B can be detected by the touch panel 14, or less. Here, the outer surface B includes two outer surfaces, in other words, an outer surface of the notched portion R1 of the lens 18 in addition to the outer surface (the outer surface A illustrated in FIG. 6(a)) of the casing 17.

In this modified example, as illustrated in FIG. 6(b), the shortest distance d (first distance) is a distance between each of the detection electrode 31a and the drive electrode 32a as the outer-edge electrode group included in the touch panel 14 and the outer surface B. It is preferable that this shortest distance d is the second distance d1 or less, and the shortest distance d may be the detectable distance or less on at least one end face that is a part of the outer surface B.

(Structure of Touch Panel)

Figure 7:
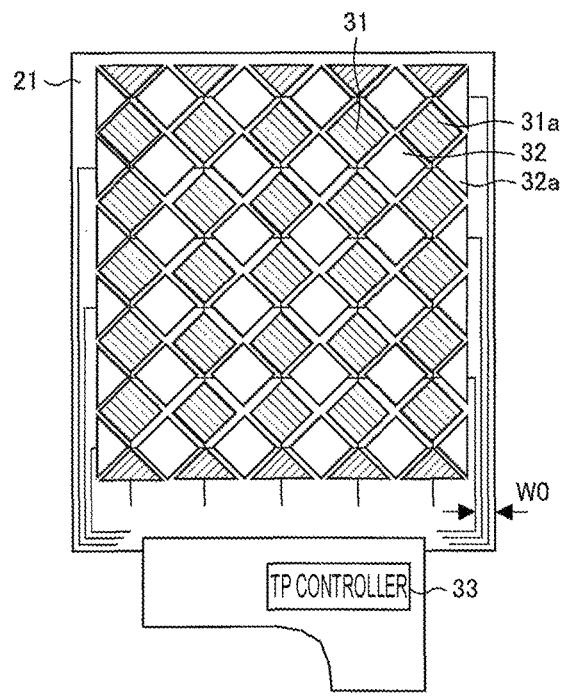
FIG. 7 is a schematic top view that illustrates an example of a touch panel included in a display device according to the present invention.

FIG. 7 is a top view that illustrates the schematic configuration of the touch panel 14. As illustrated in the drawing, the touch panel 14 includes detection electrodes 31 and drive electrodes 32 as an electrode group used for detecting a touch operation on a substrate 21 in a matrix pattern. In addition, detection electrodes 31a and drive electrodes 32a included in the electrode group are included as an outer-edge electrode group arranged along the outer edge of the touch panel 14 (in other words, the substrate 21). The detection electrodes 31 and the drive electrodes 32 are controlled by a TP controller (touch panel controller) 33.

Figure 6:
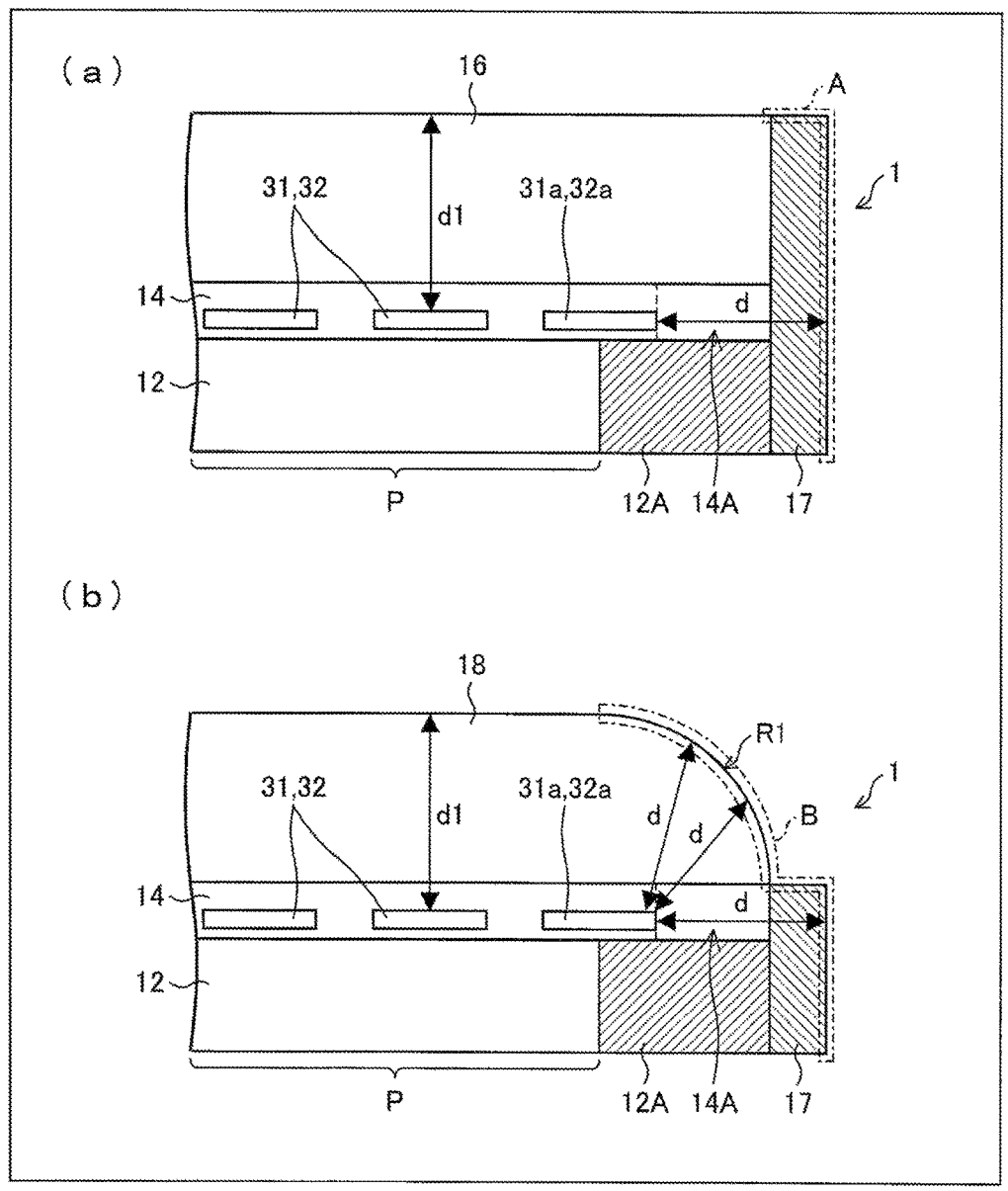
FIGS. 6(a) and 6(b) are cross-sectional views that illustrate examples of the schematic configurations of a display device according to the present invention.

The display device 1 is configured to detect a touch operation for the end face (the outer surface A or B illustrated in FIGS. 6(*a*) and 6(*b*)) of the casing 17. For this reason, in the case of the display device 1 including the cover glass 16, it is preferable that the second wiring storing portion 14A (a frame wiring width w0 of the touch panel 14) of the touch panel 14 illustrated in FIG. 6(*a*) is 1 mm or less. In addition, in the case of the display device 1 including the lens 18, it is preferable that the electrodes and the second wiring storing portion 14A are arranged so as not to disturb the optical path of light exiting from the display panel 12.

(Detection in Depth Direction)

Figure 8:
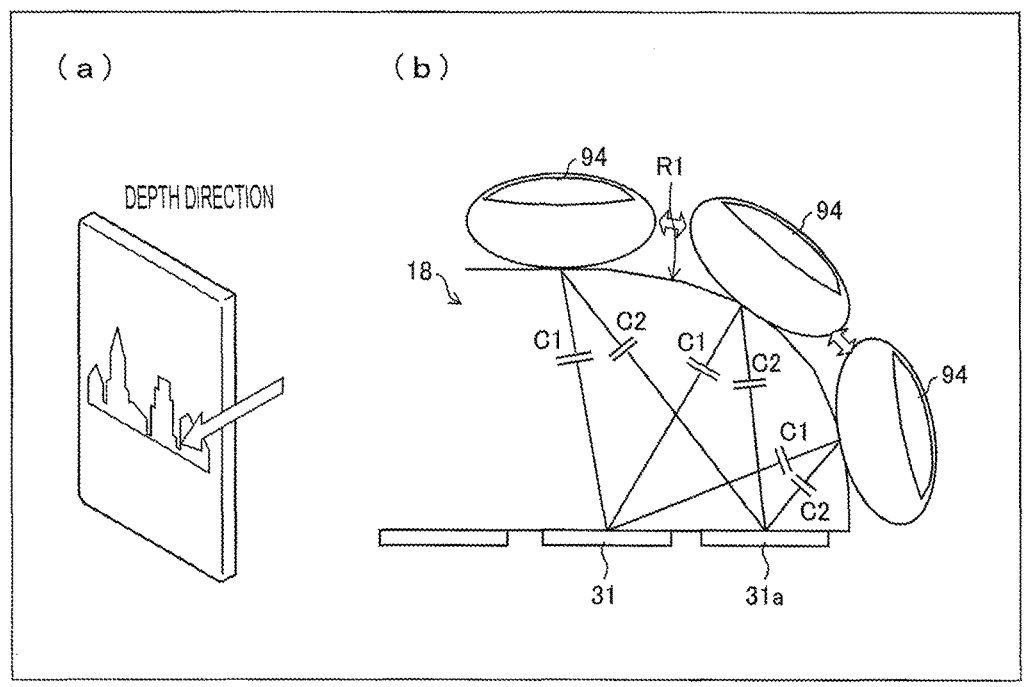
FIGS. 8(a) and 8(b) are diagrams that illustrate a method of detecting an input operation in the depth direction.

FIGS. 8(*a*) and 8(*b*) are diagrams that illustrate a method of detecting an input operation in the depth direction. In order to detect an input operation in the depth direction, it is preferable that the cover glass 16 and the lens 18 have a notched shape. Hereinafter, the display device 1 including the lens 18 that has a notched portion R1 will be used for description.

As illustrated in FIG. 8(*a*), in a case where an input operation in the depth direction of the display device 1 is present, more specifically, as illustrated in FIG. 8(*b*), a finger 94 moves so as to at least follow the notched portion R1 (a part of the outer surface B) of the lens 18. In such a case, the TP controller 33 (see FIG. 7) receives signals (electrostatic capacitance C1 and C2) from the detection electrode 31 and the detection electrode 31*a* that are adjacent to each other at the position of each finger 94 and calculates a difference (C1–C2) between the signals, thereby capable of detecting movement in the depth direction.

For the calculation of the difference, in other words, the control of reading a difference between detection electrodes adjacent to each other, a known configuration may be employed. Examples thereof are disclosed in Patent Literature 3 and the like. Thus, detailed description thereof will not be presented here.

As described above, according to the above-described configuration of the display device 1 of the present invention, the detection electrode 31*a* and the drive electrode 32*a* arranged at positions close to the end face of the casing 17 function as electrodes detecting a touch operation for a corresponding display area and also function as the outer-edge electrode group detecting a touch operation for the end face.

In this way, even in a case where an additional detection electrode used for detecting a touch operation for an end face is not arranged, instead of (or in addition to) detecting a touch operation for the display area, a touch operation for the end face (for example, the outer surface A or B) of the casing 17 of the display device 1 can be detected.

For example, in a case where a touch operation for the end face is received instead of receiving a touch operation executed on an image (on the display area) displayed on the display panel 12, the user does not need to touch a spot on the display area, and accordingly, a user's touch operation can be acquired while preventing the visibility of the image and the operability from being degraded. Alternatively, in a case where a touch operation for the end face is received in addition to the receiving of a touch operation executed on the display area, a large variety of user interfaces can be realized in the display device 1 (mobile terminal) in accordance with a combination of touch operations.

Hereinafter, the content of the operation of the display device 1 according to the present invention receiving touch operations for both the end face and the display area will be described in detail for each embodiment.

First Embodiment

The first embodiment of the present invention will be described as below with reference to FIGS. 1 to 12.

[Functional Configuration of Display Device 1]

Figure 1:
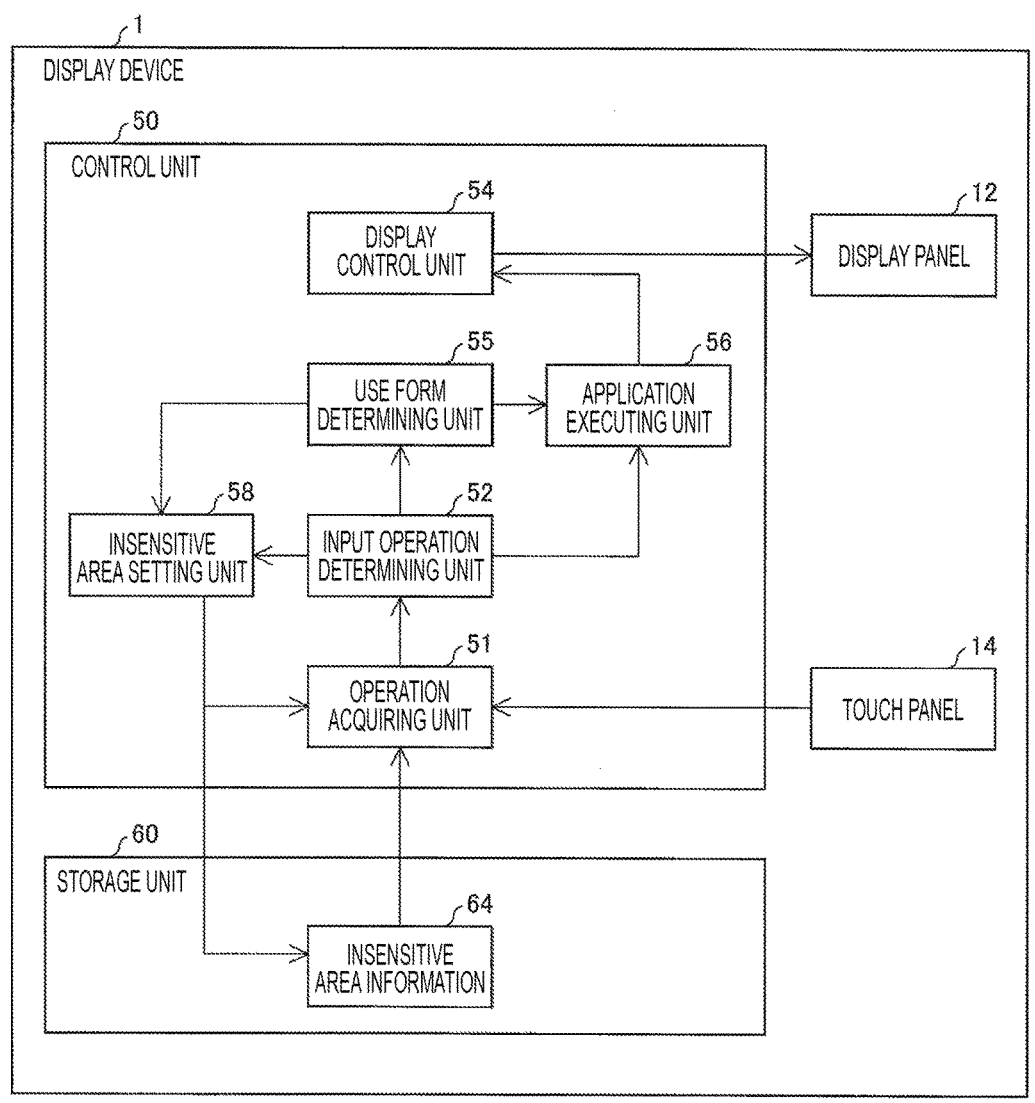
FIG. 1 is a functional block diagram that illustrates the configuration of a main portion of a display device according to a first embodiment of the present invention.

FIG. 1 is a functional block diagram that illustrates the configuration of a main portion of the display device 1. The control unit 50 of the display device 1 will be described with the process, which is executed when the display device 1 acquires a touch operation (particularly, an input operation for the end face (the outer surface A or B) of the display device 1), being mainly focused on.

As illustrated in FIG. 1, the display device 1, mainly, includes: a display panel 12; a touch panel 14; a control unit 50; and a storage unit 60. Additionally, while the display device 1 as a mobile terminal (for example, a smartphone) has general functions of a smartphone, parts thereof not directly relating to the present invention will not be described. The touch panel 14 and the display panel 12 are as described above. Hereinafter, the control unit 50 will be described. Here, the configuration of the control unit 50 is merely an example, and the control unit 50 is not limited thereto.

The control unit 50 integrally controls each unit of the display device 1 and includes: an operation acquiring unit 51; an input operation determining unit 52; a use form determining unit 55; and a display control unit 54 as functional blocks. In addition, the control unit 50 includes an insensitive area setting unit 58 that sets insensitive areas as areas for which a touch operation is not detected on the touch panel 14. Further in addition, the control unit 50 may include an application executing unit 56 that executes various applications installed to the display device 1. Each unit represented as the functional block can be realized as an operation processing device such as a CPU (central processing unit) reads a program stored in a storage device (here, the storage unit 60) such as ROM (read only memory) into a temporary storage unit (not illustrated in the drawing) such as RAM (random access memory) and executes the program.

The operation acquiring unit 51 acquires a touch operation of a target object for the display area P (see FIG. 2) of the display device 1 and the end face of the display device 1. The acquisition of a touch operation using the operation acquiring unit 51 is executed by receiving a detection signal from the TP controller 33. More specifically, the TP controller 33 detects the position of the detection electrode 31 or 31*a* at which a change in the capacitance occurs and transmits a result of the detection to the operation acquiring unit 51 as the detection signal described above.

Furthermore, in this embodiment, the operation acquiring unit 51 is configured not to acquire a detection signal that is based on a detection electrode 31 or 31*a* arranged in an insensitive area set by the insensitive area setting unit 58 as is necessary. Here, "not acquiring a detection signal from a detection electrode of an insensitive area", for example, includes instructing the TP controller 33 not to transmit a detection signal transmitted from an insensitive area to the operation acquiring unit 51 or discarding a detection signal transmitted from an insensitive area even when the detection signal is received from the TP controller 33. In this way, even when an actual touch operation is executed for an insensitive area, the display device 1 can be configured not to recognize the touch operation. An object of the setting of insensitive areas is to prevent the display device 1 to generate an erroneous operation according to an unintentional touch operation. Accordingly, among areas in which the detection electrodes 31 or 31*a* are arranged on the touch panel 14, an area that may easily generate an erroneous operation according to a use scene is specified as an insensitive area. The insensitive area is stored in the storage unit 60 as insensitive area information 64, and the operation acquiring unit 51 does not acquire a detection signal from a specific detection electrode based on the insensitive area information 64. A specific example of the insensitive area information 64 will be described later in detail.

The input operation determining unit 52 determines the position at which the touch operation is executed (hereinafter, referred to as a touch position) and the type of the executed touch operation based on the detection signal acquired by the operation acquiring unit 51. The input operation determining unit 52 transmits a result of the determination, in other words, touch operation information including information of coordinates of the touch position and the type (a tap, a double tap, a flick, a drag, pinch in, pinch out, or the like) of the touch operation to a downstream functional block. More specifically, in a case where the detection signal acquired by the operation acquiring unit 51 is based on a change in the capacitance of the detection electrode 31*a* as the outer-edge electrode group, the input operation determining unit 52 transmits the touch operation information not only to the application executing unit 56 but also to the use form determining unit 55. On the other hand, in a case where the acquired detection signal is based on a change in the capacitance of the detection electrode 31, the touch operation information is transmitted to the application executing unit 56 and the like. The control unit 50, in addition to the application executing unit 56, may include a process executing unit not illustrated in the drawing. In such a case, in a case where the process executing unit executes a certain process according to a touch operation, the input operation determining unit 52 may transmit the touch operation information to the process executing unit.

The use form determining unit 55 determines a user's use form of the display device 1 in accordance with the touch position of the target object on the end face of the display device 1.

More specifically, the use form determining unit 55 determines a holding form in accordance with a touch position on the end face at which the touch operation is executed. The holding form is information representing a user's hand holding the display device 1, and the determining of a holding form is determining whether the user uses the display device 1 with holding it either using the right hand or using the left hand. The method of determining a holding form, which are executed by the use form determining unit 55, will be described later in detail with reference to other drawings.

The application executing unit 56 executes a predetermined function (application) in accordance with a touch operation determined by the input operation determining unit 52. As examples of applications, there are a mail function, a text editing function, a web site reading function, a telephone directory function, and a game function, but the applications are not limited thereto. The application executing unit 56 realizes each function described above by executing each application program stored in the storage unit 60.

The application executing unit 56 executes a process corresponding to the touch operation information transmitted from the input operation determining unit 52 in accordance with the application program, generates a screen on which the execution result is reflected, and outputs the generated screen to the display control unit 54. For example, in a case where the touch operation gives an instruction for generating a mail, the application executing unit 56 relating to the mail function generates a user interface (UI) screen for inputting the text of the mail and outputs the generated UI screen to the display control unit 54.

The display control unit 54 displays information on the display panel 12. More specifically, the display control unit 54 outputs execution results (for example, a UI screen and the like) output by the use form determining unit 55 and the application executing unit 56 (and a process executing unit not illustrated in the drawing) to the display panel 12 as a video signal by controlling a data signal line driving circuit, a scan signal line driving circuit, a display control circuit, and the like, which are not illustrated in the drawing, included in the display device 1.

The insensitive area setting unit 58 effectively sets an insensitive area or releases the setting in accordance with the operation of the use form determining unit 55. While the insensitive area is effectively set by the insensitive area setting unit 58, the operation acquiring unit 51 does not acquire a detection signal from the detection electrode of the insensitive area. More specifically, until a predetermined end condition is satisfied after the holding form is determined by the use form determining unit 55, the insensitive area setting unit 58 writes the insensitive area information 64 representing the position of the specified insensitive area into the storage unit 60, thereby setting the insensitive area. Then, when an event satisfying the predetermined end condition occurs in the display device 1, the insensitive area setting unit 58 releases the setting. The release of the setting may be executed by instructing the operation acquiring unit 51 to acquire detection signals from all the detection electrodes from the insensitive area setting unit 58 or by removing the insensitive area information 64 using the insensitive area setting unit 58.

Alternatively, in an another embodiment, it may be configured such that the positions of the insensitive areas are fixed in advance, and the insensitive area setting unit 58 controls on/off of the setting of the insensitive areas. However, in this embodiment, as an example, the insensitive area setting unit 58 is configured to dynamically specify insensitive areas based on at least one of the holding form determined by the use form determining unit 55 and the touch position determined by the input operation determining unit 52. The insensitive areas specified by the insensitive area setting unit 58 are stored in the storage unit 60 as the insensitive area information 64 and are referred to by the operation acquiring unit 51. The method of specifying insensitive areas will be described later in detail with reference to another drawing.

The predetermined end condition, in other words, a condition for releasing the setting of the insensitive areas is not particularly limited. For example, as the condition, at a time when the holding form determined by the use form determining unit 55 is changed or the like may be considered. Alternatively, since the insensitive areas have already been set, there is a possibility that a change in the holding form may not be detected well. Thus, it may be considered that, after a predetermined time (for example, about 0.5 to 2 seconds) elapses from the previous setting of the insensitive areas, the insensitive area setting unit 58 releases the previous setting of the insensitive areas at once. Accordingly, the use form determining unit 55 can newly determine the holding form again. The insensitive area setting unit 58 sets insensitive areas in accordance with the newly determined holding form. In other words, the insensitive area setting unit 58 may be configured to update the insensitive areas for each time at the interval of the predetermined seconds and reconfigures insensitive areas. In a case where the predetermined seconds is about 0.5 seconds to two seconds as described above, it is difficult for a user to feel strangeness or stress during the operation, making such predetermined seconds preferable. Alternatively, it may be considered to release the setting when switching between screens displayed on the display panel 12 is executed. The reason for this is that, when the displayed screen is changed, there is a high possibility that the positions of fingers are changed much, and it is desirable to newly specify insensitive areas.

The storage unit 60 is a storage device that stores various kinds of data used by the display device 1. In this embodiment, the storage unit 60, at least, stores the insensitive area information 64. While not illustrated in the drawing, the storage unit 60 stores (1) control program and (2) OS program, which are executed by the display device 1, (3) various application programs executed by the display device 1 (the application executing unit 56), and (4) various kinds of data read in a case where the application programs are executed.

Various kinds of data stored in the storage unit 60 may be stored either in a volatile manner or in a non-volatile manner in accordance with the use. In other words, the storage unit 60 storing various kinds of data may be configured by a nonvolatile storage device such as ROM (read only memory) or flash memory or a volatile storage device such as RAM (random access memory) as a temporary storage unit, and a storage device that is optimal to the purpose is selected.

The insensitive area information 64 is information that represents the positions of areas, which are set as the insensitive areas, of the touch panel 14. By referring to the insensitive area information 64, the operation acquiring unit 51 may be configured not to acquire detection signals that are based on the detection electrodes 31 or 31a belonging to the insensitive areas represented by the insensitive area information 64 as is necessary.

[Determination of Holding Form]

The use form determining unit 55 determines a holding form based on the touch operation information transmitted from the input operation determining unit 52, and more particularly, a touch position on the end face.

Figure 9:
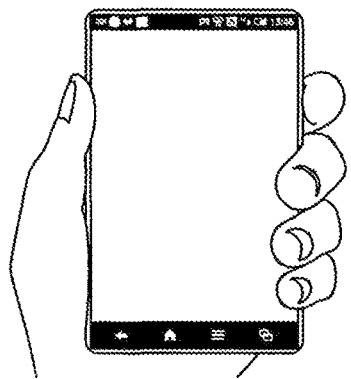
FIGS. 9(a) to 9(d) are diagrams that illustrate specific examples of holding forms determined by the display device and, more particularly, several examples of touch positions detected on an end face of a casing.
Figure 9:
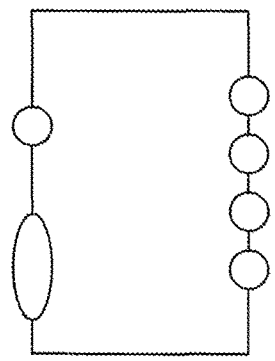
Figure 9:
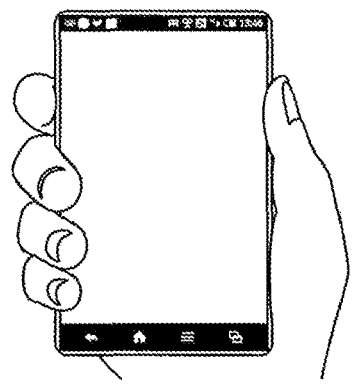
Figure 9:
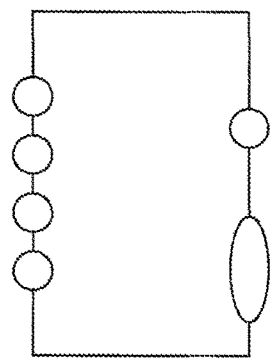
Figure 9:
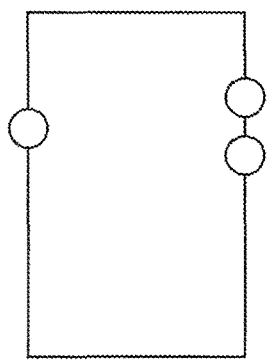
Figure 9:
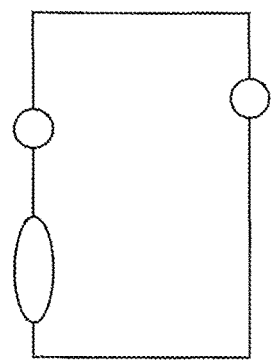

FIGS. 9(*a*) to 9(*d*) are diagrams that illustrate specific examples of the holding form, and more particularly, several examples of the touch position detected on the end face of the casing 17.

As illustrated in FIGS. 9(*a*) and 9(*b*), in a case where a user holds the display device 1 using one hand, normally, finger tips of five fingers and the base (hereinafter, referred to as a thenar) of the thumb are brought into contact with the end face. Among these, a range in which the thenar is brought into contact with the end face is wider than a range in which each of the five fingers is brought into contact therewith. For this reason, the use form determining unit 55 can specify a touch position (hereinafter, referred to as a wide touch position) extending in a range wider than that of each of the five fingers as a touch position of the thenar. In addition, as illustrated in the same drawing, the thumb and the thenar are brought into contact with a same side, and the remaining four fingers are brought into contact with a side opposing the side described above. For this reason, in a case where four touch positions (hereinafter, referred to as narrow touch positions) each having a relatively narrow range are detected on a same side, the use form determining unit 55 can specify the narrow touch positions as touch positions of the four fingers other than the thumb.

In this way, for left and right two sides of the end face that oppose each other, the use form determining unit 55 can specify a side with which the thumb and the thenar are brought into contact and a side, with which four fingers other than the thumb are brought into contact, opposing the side and can determine a holding form based on that. More specifically, as illustrated in FIG. 9(*a*), the use form determining unit 55, based on a wide touch position and two or more narrow touch positions, specifies that a side with which the thumb and the thenar are brought into contact is the left side, and a side with which four fingers are brought into contact is the right side. In the case of left-hand holding, the thumb is brought into contact with the left side, and the holding form is determined to be the left-hand holding. On the other hand, as illustrated in FIG. 9(*b*), the use form determining unit 55 specifies that a side with which the thumb and the thenar are brought into contact is the right side, and a side with which four fingers are brought into contact is the left side. Then, in the case of right-hand holding, since the thumb is brought into contact with the right side, the holding form is determined to be right-hand holding.

In addition, also in a case where a wide touch position is not detected in any side, the use form determining unit 55 can determine a holding form. For example, as illustrated in FIG. 9(*c*), a side on which no wide touch position is present, and at least two narrow touch positions are detected is specified as a side with which four fingers are brought into contact, and a side opposing the side can be specified as a side with which the thumb and the thenar are brought into contact. In the example illustrated in the drawing, the use form determining unit 55 determines that the holding form is left-hand holding. In addition, also in a case where two or more narrow touch positions are not detected in any side, the use form determining unit 55 can determine a holding form. For example, as illustrated in FIG. 9(*d*), a side on which one wide touch position is presented, and less than two narrow touch positions are present can be specified as a side with which the thumb and the thenar are brought into contact, and a side opposing the side can be specified as a side with which four fingers are brought into contact. In the example illustrated in the drawing, the use form determining unit 55 determines that the holding form is left-hand holding.

In this embodiment, in a case where a combination of the narrow touch positions and the wide touch position does not match any of the conditions described above, the use form determining unit 55 determines undeterminability and does not determine a holding form.

The holding form determining algorithm described above is an example, and thus, the method of determining a holding form that is executed by the use form determining unit 55 is not limited thereto. The use form determining unit 55 may determine right-hand holding or left-hand holding.

The use form determining unit 55 transmits the use form determined as described above, in other words, the holding form (right-hand holding or left-hand holding) to the insensitive area setting unit 58. Accordingly, the insensitive area setting unit 58 can specify appropriate insensitive areas in accordance with the holding form.

[Specifying Insensitive Area]

Figure 10:
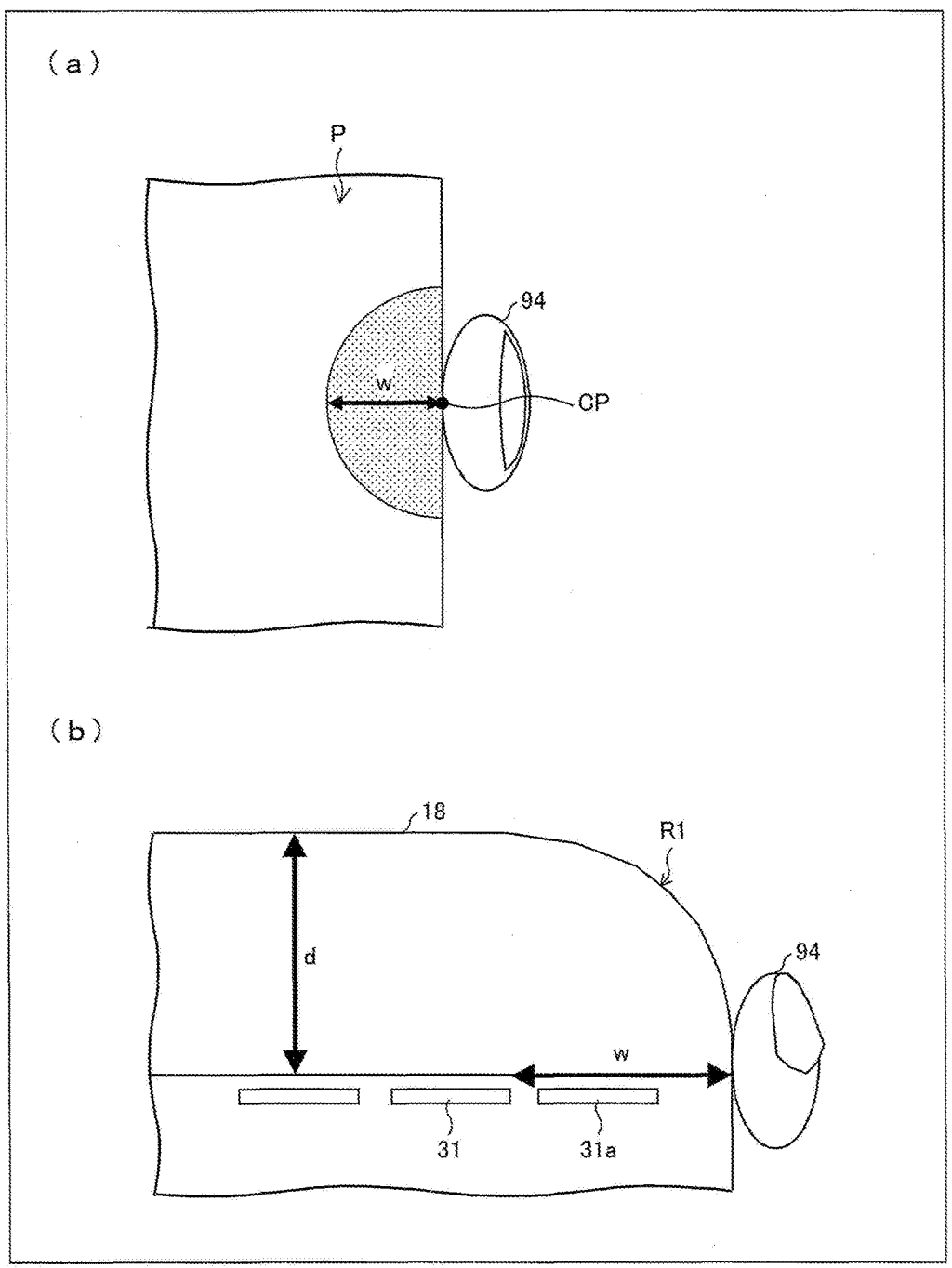
FIG. 10(a) is a plan view that illustrates a display device (FIG. 4) of the present invention and, more particularly, is a partial plan view that illustrates the periphery of a contact of a finger 94 on an end face of a main body.
FIG. 10(b) is a cross-sectional view that illustrates an example of the schematic configuration of the display device (FIG. 4) of the present invention.

FIGS. 10(*a*) and 10(*b*) are diagrams used for describing a range of an insensitive area specified by the insensitive area setting unit 58. FIG. 10(*a*) is a plan view that illustrates the display device 1 (FIG. 4) of the present invention and, more particularly, is a partial plan view that illustrates the periphery of a contact of a finger 94 on an end face of a main body. FIG. 10(b) is a cross-sectional view that illustrates an example of the schematic configuration of the display device 1 (FIG. 4) of the present invention. Since the diagram is for the purpose of describing a method of specifying an insensitive area, for the simplification of the description, layers and the like illustrated in FIGS. 3 and 5 are not illustrated therein. In addition, the casing is not illustrated in the diagram.

In this embodiment, the insensitive area setting unit 58 specifies an insensitive area based on the touch position determined by the input operation determining unit 52. More specifically, the insensitive area setting unit 58 specifies the range of a half circle on the display area P having a radius of a predetermined distance w and having the detected touch position (a point CP illustrated in FIG. 10(a)) as its center as an insensitive area. Here, for example, while the point CP, precisely, is an intersection between one side of the main body and a perpendicular line extending from the center of the range in which the finger 94 and the main body are in contact with each other to the one side of the display area P, the method of defining the center CP is not particularly limited thereto.

For example, it may be considered that the insensitive area setting unit 58 sets a distance that is the same as the thickness d of the lens 18 as the predetermined distance w. However, the predetermined distance w is not limited thereto but may be determined in the range of 0.5 d to 2 d. For the range described above, a disadvantage of not being capable of preventing an erroneous operation due to a small insensitive area and a disadvantage of the occurrence of an unnecessarily wide range for which a touch operation cannot be executed on the display area P due to a large insensitive area can be avoided.

As above, the insensitive area setting unit 58 specifies an insensitive area based on the touch position of the hand holding the display device 1 that is determined by the input operation determining unit 52 and stores the insensitive area information 64 representing the position of the specified insensitive area in the storage unit 60.

[Insensitive Area Information]

Figure 11:
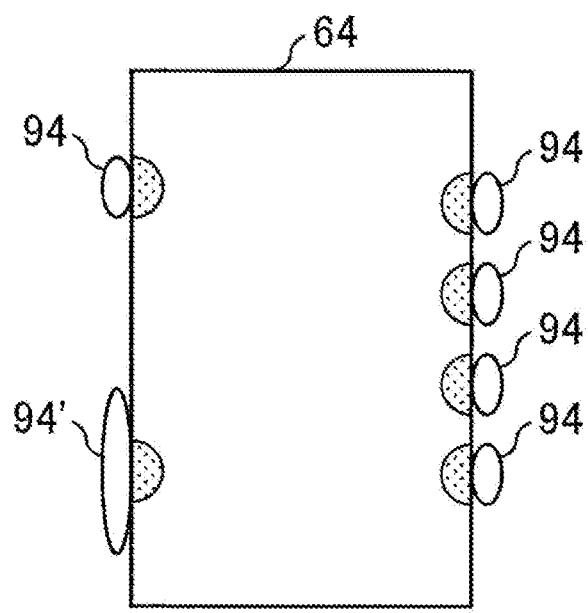
FIG. 11 is a diagram that illustrates one specific example of insensitive area information stored in a storage unit of the display device.

FIG. 11 is a diagram that illustrates one specific example of the insensitive area information 64 stored in the storage unit 60. In the example illustrated in FIG. 11, in the insensitive area information 64, insensitive areas of the touch panel 14 are illustrated with being shaded. These are specified by the insensitive area setting unit 58 based on the touch positions of five fingers 94 and the thenar 94'. In FIG. 11, while the touch positions of the fingers are illustrated for the description, the information of these touch positions may not be included in the insensitive area information 64.

The operation acquiring unit 51 does not acquire detection signals from the detection electrodes 31 and 31a included in the insensitive areas illustrated with being shaped in accordance with an instruction from the insensitive area setting unit 58 by referring to the insensitive area information 64 illustrated in FIG. 11.

[Process Flow]

Figure 12:
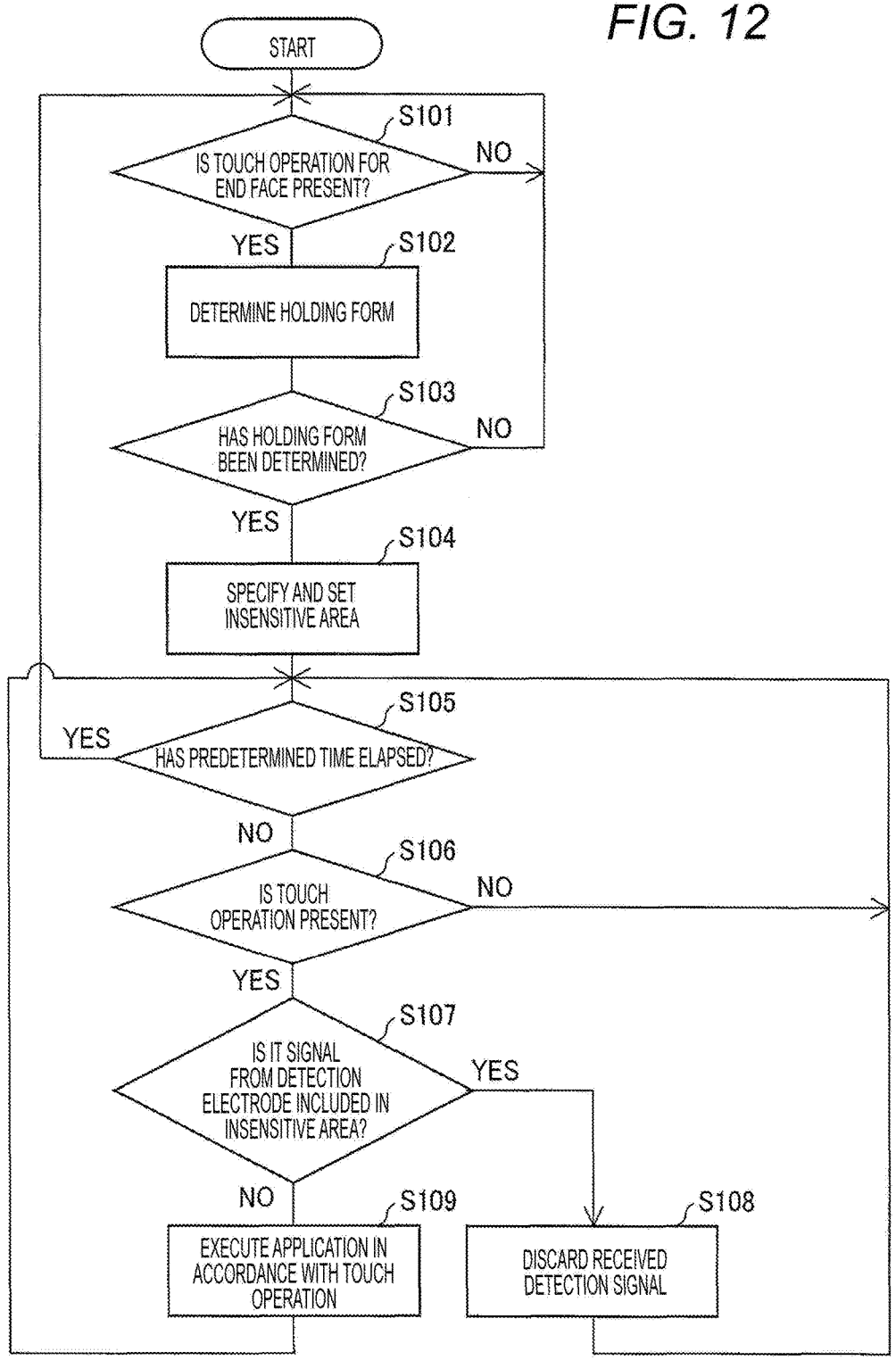
FIG. 12 is a flowchart that illustrates the process flow of a touch operation for an end face that is executed by a display device according to a first embodiment.

FIG. 12 is a flowchart that illustrates the flow of the process of a touch operation for the end face that is executed by the display device 1 according to the first embodiment.

When a touch operation for an end face (the outer surface A or B illustrated in FIGS. 6(a) and 6(b)) of the display device 1 is acquired by the operation acquiring unit 51 (Yes in S101), touch operation information including the touch position is supplied from the input operation determining unit 52 at least to the use form determining unit 55 and the insensitive area setting unit 58. First, the use form determining unit 55, based on the supplied touch operation information, determines a holding form of the display device 1 (S102). Here, in a case where a holding form can not be determined (No in S103), the display device 1 may be returned to a state for receiving a touch operation without executing the subsequent process.

In a case where a holding form is determined by the use form determining unit 55 (Yes in S103), the insensitive area setting unit 58 specifies insensitive areas (S104). For example, based on the touch position determined by the input operation determining unit 52, an area of a half circle having the touch position as its center and having a radius of a predetermined distance on the touch panel 14 is specified as an insensitive area. The insensitive area setting unit 58 stores the insensitive area information 64 in the storage unit 60 and notifies the operation acquiring unit 51 of the setting of the insensitive area. Thereafter, until the setting is released, the operation acquiring unit 51 does not acquire a detection signal from the insensitive area.

More specifically, in a case where a touch operation is detected using the detection electrode 31 (31a) while a predetermined time (for example, 0.5 to 2 seconds) has not elapsed (No in S105 and Yes in S106), the operation acquiring unit 51 determines whether or not the received detection signal is transmitted from the detection electrode belonging to the insensitive area (S107). Then, in the case of the detection signal transmitted from the insensitive area (Yes in S107), the detection signal is discarded (S108). In this way, the detection signal is not supplied to the input operation determining unit 52, and the display device 1 does not recognize the touch operation occurring in S106. On the other hand, in a case where the received detection signal is a signal transmitted from the detection electrode belonging to an area other than the insensitive area (No in S107), as described above, the touch operation information is supplied to the application executing unit 56 through the input operation determining unit 52, and the application executing unit 56 executes an application in accordance with the touch operation (S109).

An insensitive area valid mode (in other words, a mode in which a detection signal transmitted from the insensitive area is not acquired) described above is repeated until an end condition (S105) that a predetermined time elapses after the start of the mode is satisfied. On the other hand, when the predetermined time elapses (Yes in S105), the insensitive area setting unit 58 releases the setting of the insensitive area and gives an instruction for ending the insensitive area valid mode. In this way, the operation acquiring unit 51 is returned to a normal mode in which detection signals are acquired from all the detection electrodes, and the display device 1 is returned to a state in which a touch operation for the end face can be received in S101.

As above, according to the above-described configuration of the display device 1 and the method according to the first embodiment of the present invention, after a holding form is determined by the use form determining unit 55, only the periphery of the finger holding the display device 1 is temporarily in a state in which a touch operation cannot be received. For this reason, after the user holds the display device 1, continuously, while the display area P is operated, even in a case where a finger finely moves a short distance on the end face, the input operation determining unit 52 does not recognize that the end face is operated through a touch each time.

After holding the display device 1, the user executes a touch operation for the display area P for executing an application or the like. According to the display device 1 of the present invention, the application executing unit 56 can generate an optimal screen in accordance with the holding form determined by the use form determining unit 55.

However, after the holding form (the right-hand holding/the left hand holding) is determined, a touch position on the end face does not need to be frequency detected. The reason for this is that the holding form hardly changes frequency during an extremely short period. The continuation of the detection of the touch operation for the end face of the casing 17 rather disturbs the reception of a touch operation for the display area and the process executed by the application executing unit 56. The reason for this is that the application executing unit 56 needs to generate the screen again in accordance with a holding form that is changed frequently in a short period.

Thus, in order to avoid such a disadvantage, the display device 1 of the present invention, as described above, after the holding form is determined, stops responding to a fine motion of the finger on the end face of the casing 17 for a constant time. In this way, each unit of the display device 1 can continuously execute a process according to a touch operation for the display area based on the holding form specified in advance.

As above, according to the display device 1 of the present invention, when the user executes a touch operation for the display area, even in a case where a finger brought into contact with the end face unintentionally moves, an effect of preventing an erroneous operation by responding to the unintended motion of the finger is acquired.

Second Embodiment

Figure 13:
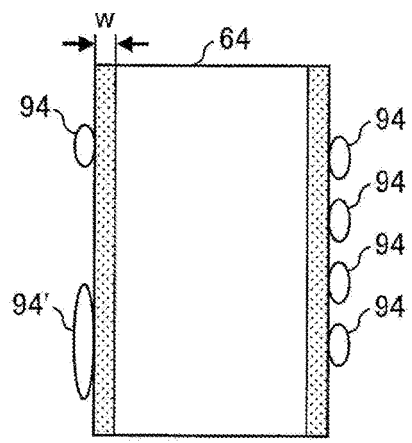
FIG. 13 is a diagram that illustrates another specific example of the insensitive area information stored in the storage unit of the display device.

FIG. 13 is a diagram that illustrates another specific example of the insensitive area information 64 stored in the storage unit 60.

According to the second embodiment, areas having a width of a distance w disposed at the left and right ends of the touch panel 14 may be fixedly specified as insensitive areas. In this embodiment, as illustrated in FIG. 13, the insensitive area information 64 represents band-shaped areas having the width of the distance w disposed at both the left and right ends of the touch panel 14 as insensitive areas.

According to the configuration described above, the configuration of the insensitive area setting unit 58 can be simplified. In other words, the insensitive area setting unit 58 does not need to specify insensitive areas each time in accordance with the touch positions and may instruct the operation acquiring unit 51 of on/off of the insensitive area valid mode (a mode in which detection signals transmitted from the detection electrodes of the insensitive area are not acquired).

Similar to the first embodiment, after the holding form is determined by the use form determining unit 55, the insensitive area setting unit 58 notifies the operation acquiring unit 51 of the start of the insensitive area valid mode. Then, the insensitive area setting unit 58 notifies the operation acquiring unit 51 of the end of the insensitive area valid mode when the end condition expires (for example, after an elapse of a predetermined time).

Third Embodiment

Figure 14:
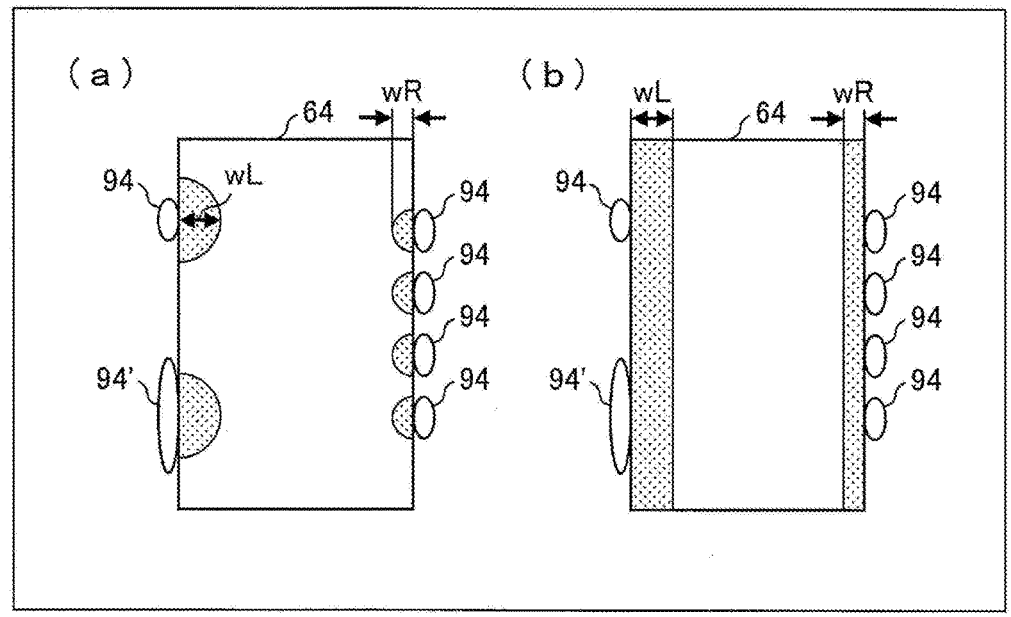
FIGS. 14(a) and 14(b) are diagrams that illustrate further another specific examples of the insensitive area information stored in the storage unit of the display device.

FIGS. 14(a) and 14(b) are diagrams that illustrate further another specific examples of the insensitive area information 64 stored in the storage unit 60.

According to the third embodiment, the insensitive area setting unit 58 may dynamically specify insensitive areas in consideration of not only the touch position but also the holding form determined by the use form determining unit 55. More specifically, it is preferable that the insensitive area setting unit 58 specifies an insensitive area disposed on a side of the touch panel 14 with which the thumb or the thenar is brought into contact to be wider than an insensitive area disposed on another side with which the four fingers are brought into contact. In other words, in a case where the holding form is the left-hand holding, a distance wL determining the size of the insensitive area disposed on the left side is determined to be longer than a distance wR determining the size of the insensitive area disposed on the right side. On the other hand, in a case where the holding form is the right-hand holding, the values of the distance wL and the distance wR are determined such that "distance wL<distance wR".

FIG. 14(a) illustrates an example of insensitive areas specified based on the touch positions by the insensitive area setting unit 58 in consideration of the holding form in a case where the holding form is determined to be the left-hand holding. Compared with the insensitive area information 64 illustrated in FIG. 11, the radiuses of half circles are not uniform between the left and right sides. The insensitive area setting unit 58 determines distances such that, when the radius of the half circle of the left side and the radius of the half circle of the right side are represented as the distance wL and the distance wR, "distance wL>distance wR" is satisfied. For example, the radius of the left side may be 1.5 times the radius of the right side.

FIG. 14(b) illustrates an example in which, in a case where the holding form is determined to be the left-hand holding, the insensitive area setting unit 58 corrects a part of the fixed insensitive area information 64 in consideration of the holding form. Compared with the insensitive area information 64 illustrated in FIG. 13, there is a difference between the widths of the insensitive areas of both the sides. The insensitive area setting unit 58 determines distances such that, when the horizontal width of the insensitive area of the left side is represented as the distance wL, and the horizontal width of the insensitive area of the right side is represented as the distance wR, "distance wL>distance wR" is satisfied. For example, the width of the left side may be 1.5 times the width of the right side. The insensitive area setting unit 58 makes a correction for the insensitive area information 64 illustrated in FIG. 11 determined in advance based on the holding form. In a case where the holding form is determined to be the left-hand holding, the insensitive area setting unit 58 executes at least one of a correction enlarging the horizontal width of the insensitive area of the left side and a correction reducing the horizontal width of the insensitive area of the right side.

According to the configuration described above, the motion of the thumb or the thenar on the end face is more difficult to detect than the remaining four fingers in the insensitive area valid mode.

The thumb and the thenar are brought into contact with the end face and the display area P in a larger area than that of each of the other four fingers and thus, may easily cause an erroneous operation.

For this, by configuring the insensitive area of the side with which the thumb and the thenar are brought into contact to be wider, the insensitive areas can be set more appropriately. Described in more detail, a disadvantage of being incapable of preventing an erroneous operation due to a small insensitive area on the side with which the thumb and the thenar are brought into contact is appropriately avoided, and a disadvantage of unnecessarily increasing the range in which a touch operation cannot be executed on the display area P due to a large insensitive area on the opposite side can be appropriately avoided.

Fourth Embodiment

[Display of UI Component According to Touch Position of Thumb]

In the first to third embodiments, the display device 1 may display UI components that can be operated according to a touch operation for an end face using the thumb on the display panel 12.

Figure 15:
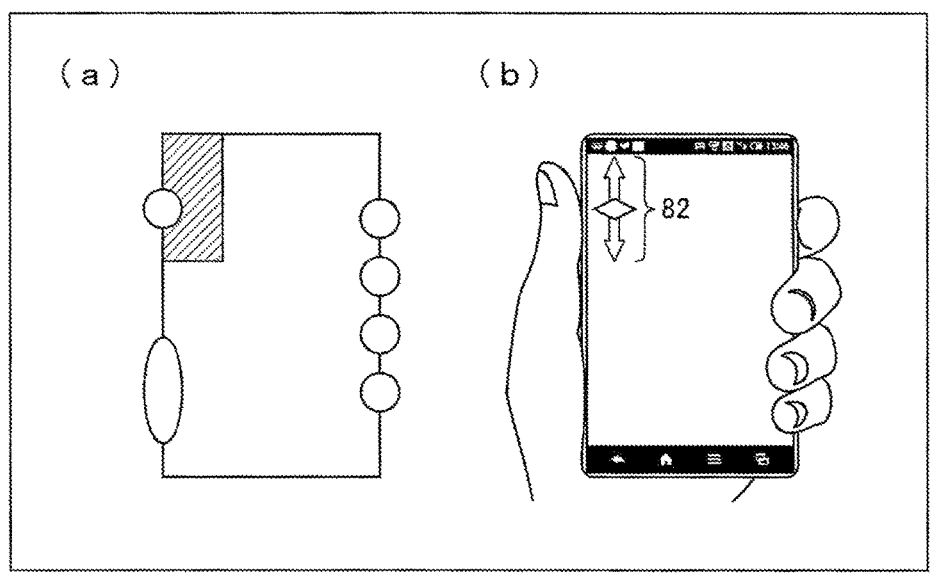
FIGS. 15(a) and 15(b) are diagrams that illustrate the function of the display device according to the present invention that displays UI components in accordance with a touch position of a touch operation for an end face.

FIGS. 15(a) and 15(b) are diagrams that illustrate the function of the display device 1 displaying the UI components described above.

More specifically, first, the use form determining unit 55 specifies a touch position of the thumb on the end face based on the touch operation information supplied from the input operation determining unit 52. As illustrated in FIG. 15(a), the use form determining unit 55 can specify a narrow touch position detected on a same side as that of a wide touch position, in other words, the thenar as a touch position of the thumb. Alternatively, also when a wide touch position is not detected, in a case where two or more narrow touch positions are detected on one side, one narrow touch position on a side opposing the side can be specified as a touch position of the thumb.

The use form determining unit 55 supplies the touch position of the thumb to the application executing unit 56. The application executing unit 56 arranges a UI component 82 in a predetermined range (for example, a hatched range illustrated in FIG. 15(a)) having the specified position of the thumb as the reference. A screen including the UI component 82 generated by the application executing unit 56 is supplied to the display control unit 54. The display control unit 54, as illustrated in FIG. 15(b), displays the screen described above on the display panel 12.

In this way, since the UI component 82 is displayed at a position for which an operation can be easily executed by the user using the thumb, the user's operability is improved. In the example illustrated in FIG. 15(b), the UI component 82, for example, is a slide bar. The user slides the thumb on the end face or slides the thumb on a display area in which the UI component 82 is displayed, thereby being capable of freely moving the position of the slide sum (tab).

Here, in the first to third embodiments, when the periphery of the touch position of the thumb is specified as an insensitive area, there is a problem in that a touch operation for the UI component 82 illustrated in FIG. 15(b) cannot be executed by the user using the thumb. Thus, in this embodiment, the insensitive area setting unit 58, in consideration of the UI area in which UI components are arranged by the application executing unit 56, excludes a portion of the insensitive area specified in advance, which overlaps the UI area, from the insensitive area.

FIGS. 16(a) to 16(d) are diagrams that illustrate examples of insensitive areas specified by the insensitive area setting unit 58 in consideration of the UI area (hatched area) illustrated in FIG. 15(a).

Figure 16:
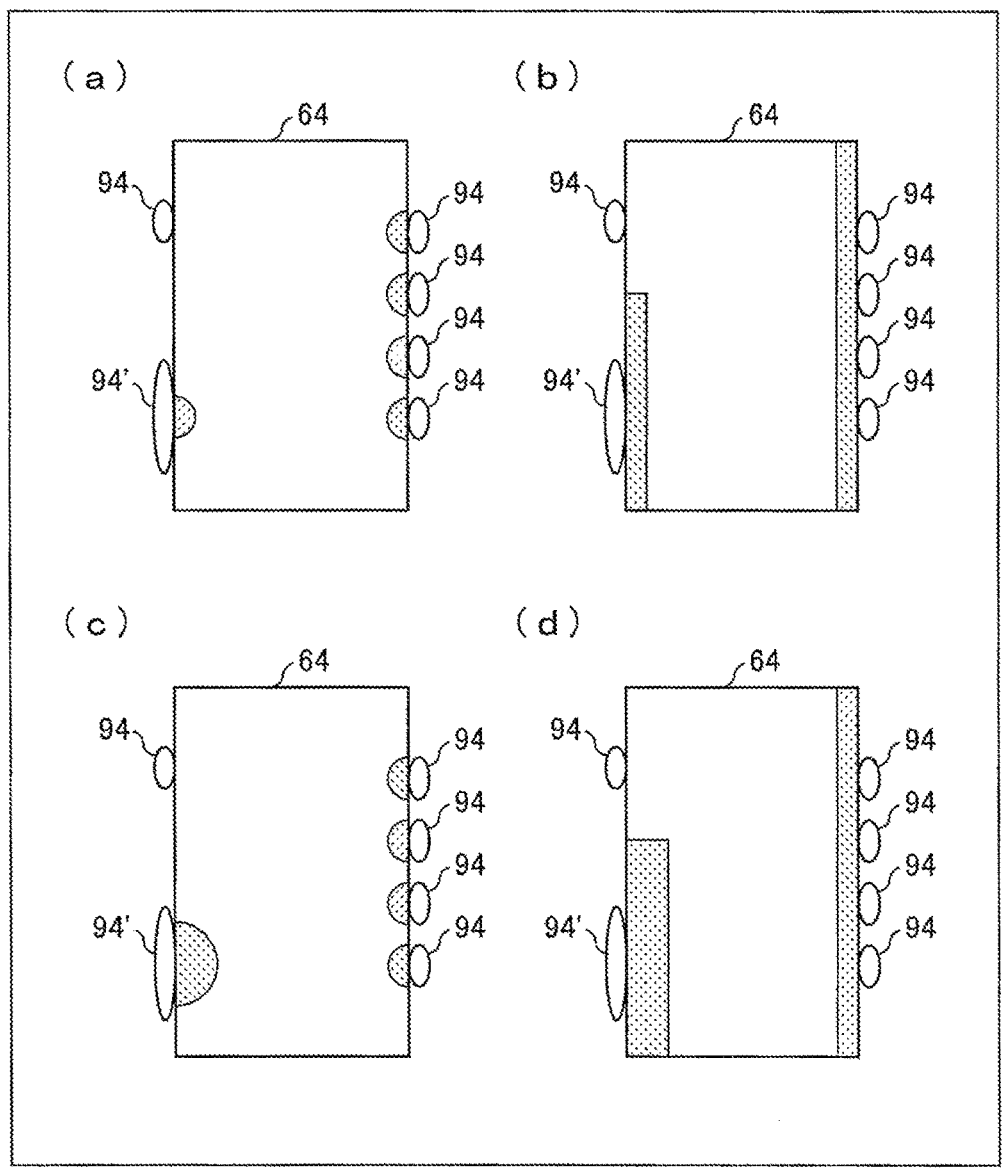
FIGS. 16(a) to 16(d) are diagrams that illustrate examples of insensitive areas specified by an insensitive area setting unit in consideration of a UI area (hatched area) in which the UI components are displayed.

As illustrated in FIG. 16(a), portions, which overlap the UI area, of the insensitive areas specified as illustrated in FIG. 11 are not to be set as insensitive areas and are excluded by the insensitive area setting unit 58.

As illustrated in FIG. 16(b), portions, which overlap the UI area, of the insensitive areas specified as illustrated in FIG. 13 are not to be set as insensitive areas and are excluded by the insensitive area setting unit 58.

As illustrated in FIG. 16(c), portions, which overlap the UI area, of the insensitive areas specified as illustrated in FIG. 14(a) are not to be set as insensitive areas and are excluded by the insensitive area setting unit 58.

As illustrated in FIG. 16(d), portions, which overlap the UI area, of the insensitive areas specified as illustrated in FIG. 14(b) are not to be set as insensitive areas and are excluded by the insensitive area setting unit 58.

According to the configuration described above, while the touch position of the thumb is set as an insensitive area, the periphery of the thumb is not set as an insensitive area, and accordingly, also after the holding form is determined, the user can intentionally execute a touch operation for the end face by using the thumb.

An effect of preventing an erroneous operation according to the present invention even in a case where the periphery of the touch position of the thumb is excluded from the insensitive area is considered to be acquired similar to the first to third embodiments. The reason for this is that the thumb, generally, is a finger used for continuously executing a touch operation for the display area P, and there is a rare case where the thumb is brought into contact with the end face against the user's intention, and there is a rare case where fingers other than the thumb are erroneously brought into contact with the end face on the periphery of the touch position of the thumb.

As above, according to the display device 1 of this embodiment, there is an effect of capable of providing a user interface that is convenient to use for the user together with avoiding an erroneous operation for the end face after the determination of the holding form and an erroneous operation according thereto.

Modified Example

In the first to third embodiments, when an application is executed, and a screen on which a result of the execution is reflected is generated, it is preferable that the application executing unit 56 does not arrange objects (UI components, icons, and the like) that are operable through a touch on the specified insensitive areas.

In the insensitive area valid mode, in a case where a detection electrode that also detects a touch operation for a part of the display area is included in the insensitive area, a detection signal transmitted from the detection electrode is not acquired by the operation acquiring unit 51, and accordingly, a state is formed in which a touch operation for a part of the display area cannot be executed.

Thus, the application executing unit 56 arranges objects that can be operated through a touch not to be displayed in the part of the display area. In this way, a disadvantage that a touch operation for an object to be originally operated through a touch cannot be executed can be avoided.

[Example of Realization Using Software]

The control blocks (particularly, the operation acquiring unit 51, the input operation determining unit 52, the display control unit 54, the use form determining unit 55, the application executing unit 56, and the insensitive area setting unit 58) of the display device 1 may be realized by either logical circuits (hardware) formed on an integrated circuit (IC chip) or software using a CPU (central processing unit).

In the latter case, the display device 1 includes: a CPU that executes an instruction of a program that is software realizing each function; ROM (read only memory) or a storage device (this will be referred to as a "recording medium") in which the program and various kinds of data are recorded in a computer-readable (or CPU-readable) form; and RAM (random access memory) in which the program is expanded; and the like. The computer (or the CPU) reads the program from the recording medium and executes the read program, whereby an object of the present invention is achieved. As the recording medium, "a medium of a non-transient type", for example, a tape, a disk, a card, a semiconductor memory, a programmable logical circuit, or the like may be used. In addition, the program may be supplied to the computer through an arbitrary transmission medium (a communication network, a broadcast wave, or the like) capable of transmitting the program. Furthermore, the present invention can be realized in the form of a data signal embedded in a carrier wave that is embodied through electronic transmission of the program.

[Summary]

A display device (1) according to a first aspect of the present invention includes: a display member (display panel 12); an operation detecting member (touch panel 14) that is superimposed on the display member; a casing (17) in which the display member and the operation detecting member are stored; a plurality of detection electrodes (31 and 31a) being arranged in the operation detecting member, the plurality of detection electrodes detecting a touch operation for a display area (P) of the display member, and some of the plurality of detection electrodes also detecting a touch operation for an end face (outer face A or outer face B) of the casing other than the display area, an operation acquiring unit (51) that acquires detection signals transmitted from the detection electrodes; a use form determining unit (55) that determines a holding form based on a touch position of the touch operation for the end face that is received as the operation acquiring unit acquires the detection signals; and an insensitive area setting unit (58) that sets an area including the touch position as an insensitive area not receiving the touch operation after the holding form is determined by the use form determining unit, the operation acquiring unit not acquiring detection signals transmitted from the detection electrodes included in the insensitive area set by the insensitive area setting unit among the plurality of the detection electrodes.

According to the configuration described above, when a touch operation for the end face of the casing 17 is detected, a holding form is determined by the use form determining unit based on the touch position. Then, after the holding form is determined by the use form determining unit, the insensitive area setting unit effectively sets an area including the touch position as an insensitive area. The effectively setting of an insensitive area is causing the operation acquiring unit to operate such that a predetermined area of the operation detecting member including the touch position becomes an area not receiving a touch operation. Based on this setting, the operation acquiring unit does not acquire detection signals transmitted from the detection electrodes included in the insensitive area set by the insensitive area setting unit among the detection electrodes.

After holding the display device, a user executes a touch operation for the display area for executing an application or the like. For this reason, after the holding form is determined, the display device needs to process a touch operation not only for the end face but also for the display area. However, when the user executes a touch operation for the display area by using a finger holding the display device, on the end face, the finger finely moves a short distance or is in contact with or separated from the end face. For this reason, a detection electrode also used for detecting a touch operation for the end face responds to an unintended motion of a finger and transmits a detection signal each time, which causes an erroneous operation. In addition, a disadvantage that a process to be originally executed based on a touch operation for the display area is disturbed by the erroneous operation occurs.

In contrast to this, according to the display device of the present invention, as described above, after the holding form is determined, the insensitive area setting unit sets an area including the touch position of the touch operation for the end face as the insensitive area, and a touch operation from the insensitive area is not accepted by the operation acquiring unit.

For this reason, while the user continuously executes a touch operation for the display area after holding the display device, even when a finger finely moves a short distance on the end face or is in contact with or separated from the end face, the display device does not recognize such a user's unintentional motion of the finger each time.

As above, according to the display device of the present invention, an effect of preventing an erroneous operation caused by responding to an unintentional motion of a finger even in a case where the user's finger brought into contact with the end face unintentionally moves when the user executes a touch operation for the display area is acquired.

In a display device according to a second aspect of the present invention, in the first aspect described above, the insensitive area setting unit releases the setting of the insensitive area in a case where an event satisfying a predetermined end condition occurs in the display device, the predetermined end condition including at least one of a time when the holding form determined by the use form determining unit is changed, a time when a predetermined time elapses after the insensitive area is set, and a time when switching between screens displayed on the display member is executed.

According to the configuration described above, when the insensitive area setting unit effectively sets an insensitive area after the determination of the holding form that is executed by the use form determining unit, thereafter, the insensitive area setting unit releases the effective setting when at least one of end conditions described below is satisfied. The end conditions are a time when the holding form determined by the use form determining unit is changed, a time when a predetermined time elapses after the setting of the insensitive area, and a time when switching between screens displayed on the display member is executed.

When the setting is released (in other words, when the insensitive area is invalidated), the operation acquiring unit acquires detection signals from all the detection electrodes again. In a situation in which the end condition is satisfied, there is a possibility that the holding form previously determined is changed. In such a case, there is concern that the insensitive area set in advance is not appropriate to the holding form after the change. Thus, in a case where the end condition is satisfied, the insensitive area setting unit releases the setting once, and the operation acquiring unit receives touch operations from all the places on the end face and the display area. Accordingly, a new touch operation is input to the display device, and each unit of the display device can be returned to a state in which an appropriate process can be executed according to the touch operation. For example, the use form determining unit can newly determine the holding form again. In such a case, the insensitive area is maintained constantly and appropriately so as to include a latest touch position.

In a display device according to a third aspect of the present invention, in the first or second aspect described above, the insensitive area setting unit specifies an insensitive area of the operation detecting member based on the touch position of the touch operation for the end face.

According to the configuration described above, the insensitive area setting unit dynamically specifies an insensitive area so as to include the latest position of the finger. Accordingly, even when the position of each finger of the user holding the display device moves much, the display device can be configured not to recognize a touch operation occurring at the latest position of the finger or on the periphery thereof each time, and accordingly, an erroneous operation can be appropriately prevented.

In a display device according to a fourth aspect of the present invention, in the third aspect described above, the insensitive area setting unit specifies a half circle area having a radius of a predetermined distance having the touch position of the touch operation for the end face as its center as the insensitive area.

According to the configuration described above, the insensitive area specified by the insensitive area setting unit is restricted to a half circle area having a radius of a predetermined distance and having the touch position at its center. In this way, in a case where the finger unintentionally moves by using the position of the finger holding the display device as the center, the useless unintentional touch operation can be configured not to be recognized. In addition, since the insensitive area is restricted to the requisite minimum as described above, a disadvantage of not accepting a touch operation for the display area, which is to be originally accepted, can be avoided.

In a display device according to a fifth aspect of the present invention, in the first or second aspect described above, a storage member (storage unit 60) that stores insensitive area information representing a position of the insensitive area is further included, and, while the insensitive area is set to be valid by the insensitive area setting unit, the operation acquiring unit does not acquire detection signals from the detection electrodes included in the insensitive area represented by the insensitive area information stored in the storage member.

According to the configuration described above, the operation acquiring unit can be configured not to accept a touch operation for the insensitive area designated in the insensitive area information stored in the storage member. Accordingly, the insensitive area setting unit does not need to dynamically specify the insensitive area when the holding form is determined, and the operation acquiring unit may be instructed whether to validate the insensitive area or not. Thus, the configuration of the insensitive area setting unit can be simplified.

In a display device according to a sixth aspect of the present invention, in the fifth aspect described above, the insensitive area information represents band-shaped areas each having a predetermined width at left and right ends of the operation detecting member as the insensitive areas.

When the user holds the display device, fingers are brought into contact with the left and right ends of the casing of the display device, and accordingly, by storing band-shaped areas each having a predetermined width disposed at the left and right ends of the operation detecting member in the storage member as insensitive areas, the insensitive areas are set so as to constantly include the touch position.

In a display device according to a seventh aspect of the present invention, in any one of the first to sixth aspects described above, the insensitive area setting unit specifies an insensitive area of the operation detecting member based on the holding form determined by the use form determining unit.

According to the configuration described above, the insensitive area setting unit can dynamically specify the insensitive area in consideration of not only the touch position but also the left-hand holding/right-hand holding. In this way, for example, in a case where the holding form is the left-hand holding, an insensitive area is appropriately specified so as to include a portion for which an unintended touch operation (erroneous operation) may particularly easily occur at the time of the left-hand holding.

In a display device according to an eighth aspect, of the present invention, in the seventh aspect described above, the insensitive area setting unit specifies the insensitive area disposed at the left end of the operation detecting member to be wider than the insensitive area disposed at the right end in a case where the determined holding form is left-hand holding and specifies the insensitive area disposed at the right end of the operation detecting member to be wider than the insensitive area disposed at the left end in a case where the determined holding form is right-hand holding.

In a case where the holding form is the left-hand holding, when a touch operation is to be executed for the display area using the thumb of the left hand, an erroneous operation may easily occur in a range on the periphery of the left end that is wider than that of the right end of the casing (or the operation detecting member). In the case of the right-hand holding, such a range is reversed.

Thus, the insensitive area setting unit specifies the insensitive area disposed at the left end to be wider than the insensitive area disposed at the right end in case of the left-hand holding and specifies the insensitive area disposed at the right end to be wider than the insensitive area disposed at the left end in case of the right-hand holding.

In this way, the insensitive area can be suppressed to a requisite minimum, and an erroneous operation can be appropriately avoided.

In a display device according to a ninth aspect of the present invention, in the first to eighth aspects described above, a process executing unit that executes a predetermined process and generates a screen including an object that can be operated by a touch operation as a result of the execution is further included, and the insensitive area setting unit excludes an area in which the object is displayed from the insensitive area.

According to the configuration described above, the process executing unit generates a screen by executing a predetermined process, and accordingly, the screen including an object that can be operated by a touch operation is displayed on the display member. Here, in a case where the area in which the object is displayed is the insensitive area, a situation occurs in which a touch operation cannot be executed for the object to be operated through a touch.

In order to resolve such an disadvantage, the insensitive area setting unit excludes an area in which the object, which can be operated through a touch, included on the screen output by the process executing unit is displayed from the insensitive area.

Accordingly, the disadvantage described above can be resolved.

A touch-operation processing method according to a tenth aspect of the present invention that is executed by a display device including: a display member; an operation detecting member that is superimposed on the display member; and a casing in which the display member and the operation detecting member are stored, a plurality of detection electrodes being arranged in the operation detecting member, the plurality of detection electrodes detecting a touch operation for a display area of the display member, and some of the plurality of detection electrodes also detecting a touch operation for an end face of the casing other than the display area. The touch-operation processing method includes: acquiring detection signals transmitted from the detection electrodes; determining a holding form based on a touch position of the touch operation for the end face that is received as the detection signals are acquired in the acquiring of detection signals; setting an area including the touch position as an insensitive area not receiving the touch operation after the holding form is determined in the determining of a holding form; and not acquiring detection signals transmitted from the detection electrodes included in the insensitive area set in the setting of an area among the plurality of the detection electrodes.

Accordingly, in a display device detecting a touch operation for the display area and a part (end face) other than the display area, an effect of preventing an erroneous operation is acquired.

The display device according to each aspect of the present invention may be realized by a computer. In such a case, a display device control program realizing the display device using a computer by causing the computer to operate as each unit included in the display device and a computer-readable recording medium having the control program recorded thereon belong to the scope of the present invention.

The present invention is not limited to each embodiment described above, but various changes can be made therein in a range represented in the claim, and an embodiment acquired by appropriately combining technical means disclosed in mutually-different embodiments belong to the technical scope of the present invention. In addition, by combining technical means disclosed in the embodiments, a new technical aspect can be formed.

INDUSTRIAL APPLICABILITY

The present invention can be used for a display device capable of detecting a touch operation (a contact or an approach) of a finger or the like into an end face of a casing of the display device, for example, a multi-function mobile phone, a tablet, a monitor, a television set, and the like. Particularly, the present invention can be appropriately used for a display device (multi-function mobile phone or the like) having a relatively small size for which a touch operation can be executed by using one hand holding the display device.

REFERENCE SIGNS LIST

1 Display device
12 Display panel (display member)
14 Touch panel (operation detecting member)
17 Casing
50 Control unit
51 Operation acquiring unit
52 Input operation determining unit
54 Display control unit
55 Use form determining unit
56 Application executing unit (process executing unit)
58 Insensitive area setting unit
60 Storage unit (Storage member)
64 Insensitive area information

The invention claimed is:
1. A display device comprising:
a display member;
an operation detecting member superimposed on the display member;
a translucent substrate superimposed on the operation detecting member, the translucent substrate comprising an outer surface, the outer surface having a plate portion;
a casing storing the display member and the operation detecting member;
a plurality of detection electrodes being arranged in the operation detecting member, the plurality of detection electrodes detecting a touch operation for a display area of the display member, and some of the plurality of detection electrodes also detecting a touch operation for an end face of the casing other than the display area,
an operation acquiring unit acquiring detection signals transmitted from the detection electrodes;
a use form determining unit determining a holding form based on a touch position of the touch operation for the end face received as the operation acquiring unit acquire the detection signals;
an insensitive area setting unit setting an area including the touch position as an insensitive area not receiving the touch operation after the holding form being determined by the use form determining unit; and
a first distance and a second distance;
wherein the operation acquiring unit not acquiring detection signals transmitted from the detection electrodes included in the insensitive area set by the insensitive area setting unit among the plurality of the detection electrodes;
wherein the end face is defined as the plate portion and the casing;
wherein the plate portion and the casing surround the display member other than the display area;
wherein the first distance is defined as a shortest distance between the operation detecting member and the end face, the second distance is defined as a distance between the operation detecting member and the outer surface of the translucent substrate, and the first distance is equal to or is less than in value as the second distance.

2. The display device according to claim 1, wherein the insensitive area setting unit releases the setting of the insensitive area in a case where an event satisfying a predetermined end condition occurs in the display device, the predetermined end condition including at least one of a time when the holding form determined by the use form determining unit is changed, a time when a predetermined time elapses after the insensitive area is set, and a time when switching between screens displayed on the display member is executed.

3. The display device according to claim 1, wherein the insensitive area setting unit specifies an insensitive area of the operation detecting member based on the touch position of the touch operation for the end face.

4. The display device according to claim 3, wherein the insensitive area setting unit specifies a half circle area having a radius of a predetermined distance and having the touch position of the touch operation for the end face as the center of the insensitive area.

5. The display device according to claim 1, further comprising a storage member storing insensitive area information representing a position of the insensitive area, wherein, while the insensitive area is set to be valid by the insensitive area setting unit, the operation acquiring unit does not acquire detection signals from the detection electrodes included in the insensitive area represented by the insensitive area information stored in the storage member.

6. The display device according to claim 5, wherein the insensitive area information represents band-shaped areas each having a predetermined width at left and right ends of the operation detecting member as the insensitive areas.

7. The display device according to claim 1, wherein the insensitive area setting unit specifies an insensitive area of the operation detecting member based on the holding form determined by the use form determining unit.

8. The display device according to claim 7, wherein the insensitive area setting unit specifies the insensitive area disposed at the left end of the operation detecting member to be wider than the insensitive area disposed at the right end in a case where the determined holding form is left-hand holding and specifies the insensitive area disposed at the right end of the operation detecting member to be wider than the insensitive area disposed at the left end in a case where the determined holding form is right-hand holding.

9. The display device according to claim 1, further comprising a process executing unit executing a predetermined process and generating a screen including an object operable by a touch operation as a result of the execution, wherein the insensitive area setting unit excludes an area in which the object is displayed from the insensitive area.

10. The display device according to claim 1, wherein the outer surface of the translucent substrate further comprising a notched portion at an end of the plate portion;
    wherein the end face further defines the notched portion;
    wherein the end face defining the notched portion, the plate portion, and the casing surrounds the display member other than the display area; and
    wherein the first distance is the shortest distance between the operation detecting member and the notched portion of the outer surface.

11. A touch-operation processing method executed by a display device including: a display member; an operation detecting member superimposed on the display member; a translucent substrate superimposed on the operation detecting member, the translucent substrate comprising an outer surface, the outer surface having a plate portion; a casing storing the display member and the operation detecting member; a first distance; and a second distance, a plurality of detection electrodes being arranged in the operation detecting member, the plurality of detection electrodes detecting a touch operation for a display area of the display member, and some of the plurality of detection electrodes also detecting a touch operation for an end face of the casing other than the display area, the touch-operation processing method comprising:
    acquiring detection signals transmitted from the detection electrodes;
    determining a holding form based on a touch position of the touch operation for the end face received as the detection signals acquired in the acquiring of detection signals;
    setting an area including the touch position as an insensitive area not receiving the touch operation after the holding form being determined in the determining of a holding form; and
    not acquiring detection signals transmitted from the detection electrodes included in the insensitive area set in the setting of an area among the plurality of the detection electrodes
    wherein the end face is defined as the plate portion and the casing;
    wherein the plate portion and the casing surround the display member other than the display area;
    wherein the first distance is defined as a shortest distance between the operation detecting member and the end face, the second distance is defined as a distance between the operation detecting member and the outer surface of the translucent substrate, and the first distance is equal to or is less than in value as the second distance.

12. A display device comprising:
    a display member;
    an operation detecting member superimposed on the display member;
    a casing, the casing storing the display member and the operation detecting;
    a plurality of detection electrodes being arranged in the operation detecting member, the plurality of detection electrodes detecting a touch operation for a display area of the display member, and some of the plurality of detection electrodes also detecting a touch operation for an end face of the casing other than the display area;
    an operation acquiring unit acquiring detection signals transmitted from the detection electrodes;
    a use form determining unit determining a holding form based on a touch position of the touch operation for the end face received as the operation acquiring unit acquiring the detection signals;
    an insensitive area setting unit setting an area including the touch position as an insensitive area not receiving the touch operation after the holding form being determined by the use form determining unit; and
    a process executing unit;
    wherein the operation acquiring unit not acquiring detection signals transmitted from the detection electrodes included in the insensitive area set by the insensitive area setting unit among the plurality of the detection electrodes;
    wherein the process executing unit executes a predetermined process and generates a screen including an object operable by a touch operation as a result of the execution, wherein the application execution unit (56) arranges the object in a predetermined range corresponding to the touch position of the touch operation for the end face.

13. The display device according to claim 12, wherein the insensitive area setting unit releases the setting of the insensitive area in a case where an event satisfying a predetermined end condition occurs in the display device, the predetermined end condition including at least one of a time when the holding form determined by the use form determining unit is changed, a time when a predetermined time elapses after the insensitive area is set, and a time when switching between screens displayed on the display member is executed.

14. The display device according to claim 12, wherein the insensitive area setting unit specifies an insensitive area of the operation detecting member based on the touch position of the touch operation for the end face.

15. The display device according to claim 14, wherein the insensitive area setting unit specifies a half circle area having a radius of a predetermined distance and having the touch position of the touch operation for the end face as the center of the insensitive area.

16. The display device according to claim 12, further comprising a storage member storing insensitive area information representing a position of the insensitive area, wherein while the insensitive area is set to be valid by the insensitive area setting unit, the operation acquiring unit does not acquire detection signals from the detection electrodes included in the insensitive area represented by the insensitive area information stored in the storage member.

17. The display device according to claim 16, wherein the insensitive area information represents band-shaped areas each having a predetermined width at left and right ends of the operation detecting member as the insensitive areas.

18. The display device according to claim 12, wherein the insensitive area setting unit specifies an insensitive area of the operation detecting member based on the holding form determined by the use form determining unit.

19. The display device according to claim 18, wherein the insensitive area setting unit specifies the insensitive area disposed at the left end of the operation detecting member to be wider than the insensitive area disposed at the right end in a case where the determined holding form is left-hand holding and specifies the insensitive area disposed at the right end of the operation detecting member to be wider than the insensitive area disposed at the left end in a case where the determined holding form is right-hand holding.

20. The display device according to claim 12, wherein the insensitive area setting unit excludes an area in which the object is displayed from the insensitive area.

* * * * *